US011119907B1

(12) United States Patent
Gopal

(10) Patent No.: US 11,119,907 B1
(45) Date of Patent: Sep. 14, 2021

(54) TECHNIQUES FOR TRACKING AND TESTING CODE MODIFICATIONS USING SEMANTIC CATALOGUE

(71) Applicant: Oracle International Corporation, Redwood Shores, CA (US)

(72) Inventor: Karthikeyan Gopal, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/997,680

(22) Filed: Aug. 19, 2020

(51) Int. Cl.
*G06F 11/36* (2006.01)
*G06F 8/70* (2018.01)

(52) U.S. Cl.
CPC ............ *G06F 11/3688* (2013.01); *G06F 8/70* (2013.01); *G06F 11/362* (2013.01); *G06F 11/3692* (2013.01)

(58) Field of Classification Search
CPC ............... G06F 11/3688; G06F 11/362; G06F 11/3692; G06F 8/60
USPC .................................................. 717/124–140
See application file for complete search history.

(56) References Cited

U.S. PATENT DOCUMENTS

| 5,911,145 | A | * | 6/1999 | Arora | ..................... | G06F 40/143 |
| | | | | | | 715/207 |
| 5,937,400 | A | * | 8/1999 | Au | ........................ | G06F 40/289 |
| | | | | | | 706/55 |
| 6,487,539 | B1 | * | 11/2002 | Aggarwal | .............. | G06Q 30/02 |
| | | | | | | 705/14.23 |
| 7,028,222 | B2 | * | 4/2006 | Peterson | .................... | G06F 8/34 |
| | | | | | | 714/38.1 |
| 7,421,433 | B2 | * | 9/2008 | Xu | .......................... | G06F 16/30 |
| 8,042,097 | B2 | | 10/2011 | Aridor et al. | | |
| 8,230,387 | B2 | * | 7/2012 | Srivastava | ................ | G06T 3/40 |
| | | | | | | 717/104 |
| 8,413,119 | B2 | * | 4/2013 | Langworthy | ........... | G06F 8/437 |
| | | | | | | 717/126 |
| 8,495,001 | B2 | * | 7/2013 | Sweeney | .................. | G06F 16/36 |
| | | | | | | 706/55 |
| 8,566,789 | B2 | | 10/2013 | Siddaramappa et al. | | |
| 8,719,805 | B2 | | 5/2014 | Zhao | | |

(Continued)

OTHER PUBLICATIONS

Mahalingam et al, "Towards a Semantic, Deep Archival File System", IEEE, pp. 1-7 (Year: 2003).*

(Continued)

*Primary Examiner* — Anil Khatri
(74) *Attorney, Agent, or Firm* — Kilpatrick Townsend & Stockton LLP

(57) ABSTRACT

Techniques are described for building a semantic catalogue including a set of semantic objects. A semantic object may be used to map a granularity (e.g., a level of abstraction) and a semantic characteristic (e.g., a meaning or interpretation) to one or more code segments (e.g., a range of lines of code) of executable source code. An application development system may track modifications to the executable source code in terms of semantics using the semantic catalogue. Additionally, the application development system may execute test suites designed based on the semantic catalogue to detect semantic-related errors, semantic relationships between multiple semantic objects, or inconsistencies with semantic objects.

20 Claims, 10 Drawing Sheets

(56) References Cited

U.S. PATENT DOCUMENTS

| | | | |
|---|---|---|---|
| 8,782,734 B2* | 7/2014 | Isaacson | G06F 21/604 |
| | | | 726/1 |
| 8,798,969 B2* | 8/2014 | Heidasch | G06F 16/2457 |
| | | | 703/2 |
| 9,594,553 B2 | 3/2017 | Ji et al. | |
| 9,626,385 B2* | 4/2017 | Runchey | G06F 16/20 |
| 9,779,135 B2* | 10/2017 | Heidasch | G06F 16/3334 |
| 10,621,499 B1* | 4/2020 | Khamis | G06F 16/355 |
| 2008/0228812 A1 | 9/2008 | Oglesby et al. | |
| 2009/0133006 A1 | 5/2009 | Cheung | |
| 2014/0229919 A1 | 8/2014 | Spiridonov et al. | |
| 2015/0046904 A1 | 2/2015 | Rummler et al. | |
| 2019/0361686 A1 | 11/2019 | Gnazdowsky et al. | |

OTHER PUBLICATIONS

Kuramitsu etal, "Distributed Object-Oriented Schema for XML-based Electronic Catalog Sharing Semantics among Businesses", IEEE, p. 87-96 (Year: 2000).*

Rumbaugh, "Relations as Semantic Constructs in an object-Oriented Language", ACM, pp. 466-481 (Year: 1987).*

Hogue et al, "Thresher: Automating the Unwrapping of Semantic Content from the World Wide Web", ACM, pp. 86-95 (Year: 2005).*

Chen et al, "A Study on Semantic Query System and Key Technologies of Distributed E-catalogues", IEEE, pp. 1-5 (Year: 2008).*

"JSRs: Java Specification Requests", Community Expert Group, Available Online at: https://jcp.org/en/jsr/detail?id=250, Mar. 23, 2013, 3 pages.

Gyori et al., "Refining Interprocedural Change-Impact Analysis using Equivalence Relations", Proceedings of the 26th ACM SIGSOFT International Symposium on Software Testing and Analysis, Online Available at: https://www.microsoft.com/en-us/research/wp-content/uploads/2017/05/main.pdf, Jul. 2017, 11 pages.

Hanam et al., "Aiding Code Change Understanding with Semantic Change Impact Analysis", Available Online at: http://salt.ece.ubc.ca/publications/docs/icsme19.pdf, 2019, 11 pages.

Robbes et al., "An Approach to Software Evolution Based on Semantic Change", Available Online at: https://users.dcc.uchile.cl/~rrobbes/p/FASE2007-changes.pdf, Mar. 2007, 15 pages.

Shiva et al., "Using Semantic Wikis to Support Software Reuse", Journal of Software, vol. 3, No. 4, Online Available at: https://www.researchgate.net/profile/S_Shiva/publication/42804517_Using_Semantic_Wikis_to_Su pport_Software_Reuse/links/00463522a032d5f4cc000000/Using-Semantic-Wikis-to-Support-Software-Reuse.pdf, Apr. 2008, 8 pages.

* cited by examiner

TECHNIQUES FOR TRACKING AND TESTING CODE MODIFICATIONS USING SEMANTIC CATALOGUE

TECHNICAL FIELD

The present disclosure generally relates to techniques for building a semantic catalogue by defining semantic objects that are mapped to regions of executable source code, and using the semantic catalogue to track and test modifications made to the executable source code. More particularly, the present disclosure relates to techniques for defining a test suite mapped to a set of semantic objects and executing the test suite to detect semantic-related errors or semantic relationships between multiple semantic objects.

BACKGROUND

Cloud-based services are in high demand. The term cloud-based service is generally used to refer to a service or capability that is made available by a cloud services provider to users on demand (e.g., via a subscription model) using systems and scalable infrastructure (cloud infrastructure) provided by the cloud services provider. Typically, the servers and systems that make up the cloud service provider's infrastructure are separate from the user's own on-premises servers and systems. Users can thus avail themselves of the flexibility and scale of cloud services provided by a cloud service provider without having to purchase separate hardware and software resources for the services. Cloud service providers can provide users with a wide variety of cloud-based services, such as Software-as-a-Service (SaaS), Platform-as-a-Service (PaaS), Infrastructure-as-a-Service (IaaS), and others.

With respect to the IaaS cloud-based service, the cloud service provider provides configurable infrastructure resources (e.g., compute resource, memory resources, networking resources such as servers, storage devices, etc.) to users. For example, in some IaaS cloud-based services, a user can customize the cloud-based network resources, such as network topology, in a flexible manner that is specific to the needs of the user's enterprise. Given the high demand for cloud-based services, cloud service providers generally provide customers (e.g., enterprises) with a wide range of applications, services, functionality, and APIs that are frequently updated and improved to enable the customers to efficiently build virtual networks in a highly available distributed system.

However, continuously updating and improving the cloud-based service involves frequent modifications to the underlying executable source code that implements the cloud-based service. A cloud-based service is often implemented using lengthy executable source code that can reach potentially millions of lines of code. The executable source code undergoes frequent modifications made by a team of developers for various reasons, such as to fix bugs that users experienced when using the cloud-based service, add functionality to improve the capabilities of the cloud-based service, or modify existing capabilities to provide certain features to users.

As cloud-based services, such as IaaS, become more robust (e.g., millions of lines of code with hundreds of features), however, a larger team of developers is needed to manage and operate the cloud-based service. A larger team of developers typically results in many modifications to the executable source code at unpredictable times by potentially new team members. In this scenario, however, debugging errors in the executable source code after each modification becomes increasingly time consuming and burdensome; especially when a developer did not write the code being debugged.

In many cases, a cloud-based service or application may still not be implemented correctly, even if executing a test suite does not identify any bugs. Whether or not the executable source code of the cloud-based service correctly implements a verified system design is a matter of semantics that is not detected by test suites. However, test suites are not designed to detect, for example, whether source code correctly implemented a verified design, despite the importance of semantic correctness in today's cloud-based services.

BRIEF SUMMARY

Certain aspects and features of the present disclosure relate to techniques for building a semantic catalogue to track and test modifications to the executable source code of a cloud-based service or application in terms of semantics. A semantic catalogue may include a data structure configured to store a set of semantic objects that the cloud-based service or application is designed to implement. A semantic object may include a user-defined representation of a semantic (e.g., a meaning or interpretation) of at least a portion of syntax contained in a code segment (e.g., code that implements a function) or multiple code segments in the same or different source code repository. A semantic object may also map a semantic characteristic to a location (e.g., a range of lines of the executable source code) of a particular code segment.

Additionally, a semantic object may be mapped to a code segment that addresses one of various scenarios (e.g., a sunny-day scenario, a failure scenario, etc.) that may occur during the operation of the cloud-based service or application. To illustrate and only as a non-limiting example, the executable source code of a cloud-based service may include a code segment that implements a doubly-linked circular list at lines 15-29 of the source code to store incoming data packets. Four semantic objects may be defined to represent the various scenarios associated with the doubly-linked circular list. A first semantic object may be mapped to lines 15-18 of the source code, which addresses scenarios involving a doubly-linked circular list that is empty. A second semantic object may be mapped to lines 19-22 of the source code, which addresses scenarios involving a doubly-linked circular list constructed with only one node. A third semantic object may be mapped to lines 23-25 of the source code, which addresses scenarios involving a doubly-linked circular list constructed with only two nodes. A fourth semantic object may be mapped to lines 26-29 of the source code, which addresses scenarios involving a doubly-linked circular list constructed with two or more nodes. The four semantic objects may be defined by a user for each function of the doubly-linked circular list class, such as the "insert( )" function, the "delete( )" function, the "traverse( )" function, and so on. Accordingly, the semantic catalogue may at least include the full set of semantic objects defined by a user to represent the various scenarios that may occur with respect to a doubly-linked circular list included in the executable source code.

In some implementations, a semantic object may be characterized by one or more of a variety of different semantic characteristics. Non-limiting examples of the various different semantic characteristics include at least a spatial semantic, a temporal semantic, a data semantic, a design semantic, a security semantic, and other suitable semantic characteristics. A semantic object may be defined as having a spatial semantic characteristic when the semantic object is mapped to one or more code segments of a particular operation or function defined at a spatial location within source code. A semantic object may be defined as having a temporal semantic characteristic when executing a code segment at a given time alters the input or behavior of a different code segment executed at a later time. A semantic object may be defined as having a data semantic characteristic when the semantic object is mapped to a code segment that handles an input parameter or argument to a function. A semantic object may be defined as having a design semantic characteristic when the semantic object is mapped to a code segment that implements a design element of a system, such as a distributed system. A semantic object may be defined as having a security semantic characteristic when the semantic object is mapped to a code segment that addresses a security-related scenario. The above-noted semantic characteristics are exemplary, and thus, other semantic characteristics may be used.

In some implementations, a semantic object may be characterized by a granularity, which represents a level of abstraction of the semantic object. For example, the level of abstraction characterizing a system is higher than the level of abstraction characterizing a sub-system or component of the system. Further, the level of abstraction characterizing the sub-system or component is higher than the level of abstraction characterizing the source code (e.g., syntax) that implements the sub-system or component of the system. Thus, the granularity of a semantic object may refer to the level of abstraction of the system, sub-system, component, syntax, and so on, to which the semantic object is mapped. The granularity of a semantic object may be useful in the context of debugging the executable source code.

The semantic catalogue may be used to track and test executable source code at a semantic level. An application development system may track modifications made to the source code of an application in terms of the semantic objects included in the semantic catalogue. To illustrate and as only a non-limiting example, a semantic object may be mapped to a code segment of source code. The application development system may track modifications made to the code segment by determining a delta between the prior version of the source code (e.g., before the modification is merged) and the modified source code (e.g., after the modification is committed and merged into the source code). The delta between the prior version of the source code and the modified version of the source code may be stored in a repository specific to the semantic object that is mapped to the code segment. Each semantic object may be associated with a repository that tracks modifications to the associated code segment. Tracking modifications in terms of a semantic object may include determining the delta and storing the delta in the repository specific to the semantic object after each instance the source code is modified.

Additionally, the application development system may execute test suites to test modified source code for semantic-related errors or inconsistencies with semantic objects. Executing a test suite configured using a semantic catalogue may also expose a semantic relationship between two or more semantic objects. To illustrate and only as a non-limiting example, a semantic relationship may be exposed when executing Test #3 on source code causes Test #1 and Test #2 to fail. If Test #1 is designed to test the code segment associated with semantic object #1, Test #2 is designed to test the code segment associated with semantic object #2, and Test #3 is designed to test the code segment associated with semantic object #3, then a semantic relationship exists between semantic object #1 and semantic object #2 when executing Test #3 causes Test #1 and Test #2 to fail. The identity of a semantic relationship may be useful in the context of debugging the executable source code.

In some implementations, a computer-implemented method includes accessing executable source code of an application. The executable source code includes one or more code segments. Each code segment of the one or more code segments is defined at a location within the executable source code. The computer-implemented method also includes identifying a code segment of the one or more code segments included in the executable source code. The computer-implemented method includes defining a semantic object mapped to the location of the code segment. The definition of the semantic object includes attributing a granularity and a semantic characteristic to the semantic object. The semantic characteristic is attributed from amongst a plurality of semantic characteristics, and the granularity represents a level of abstraction of the semantic object. The computer-implemented method also includes building a semantic catalogue using the defined semantic object. The computer-implemented method also includes detecting a modification made to at least a portion of the code segment of the executable source code. The computer-implemented method also includes identifying the semantic object associated with the modified code segment. The computer-implemented method also includes tracking the modification made to the code segment by storing the modification in a repository corresponding to the semantic object. Other embodiments of this aspect include corresponding computer systems, apparatus, and computer programs recorded on one or more computer storage devices, each configured to perform the actions of the methods.

Optionally, the computer-implemented method further includes accessing a test suite including a plurality of test cases. The plurality of test cases includes a first test case mapped to a first semantic object and a second test case mapped to a second semantic object. Each of the first semantic object and the second semantic object are included in the semantic catalogue. The computer-implemented method also includes executing each test case of the plurality of test cases included in the test suite and detecting that, upon executing the first test case, an outcome of the second test case indicates a failure. The computer-implemented method may also include in response to the detection, defining a semantic relationship between the first semantic object and the second semantic object.

Optionally, the computer-implemented method further includes defining a semantic relationship map including the defined semantic relationship between the first semantic object and the second semantic object and another semantic relationship exposed by executing the test suite.

Optionally, the computer-implemented method further includes detecting a bug within the executable source code, where the bug is detected when: executing the code segment results in an inconsistency associated with the semantic characteristic assigned to the code segment; or an input parameter passed into the code segment is inconsistent with the set of semantic objects included in the semantic catalogue.

Optionally, the plurality of semantic characteristics includes any combination from a group including a spatial semantic, a temporal semantic, a data semantic, a design element semantic, or a security semantic. The spatial semantic represents logic of a function defined at a particular location within the executable source code. The temporal semantic associates a first semantic object with a second semantic object when the output of the first semantic object executed at a given time affects the input of the second semantic object executed at a later time. The design element semantic represents a design feature of a portion of the executable source code. The data semantic represents a semantic of an input parameter to a given code segment attributed as the spatial semantic. The security semantic represents a security feature associated with a distributed system.

Optionally, the computer-implemented method further includes defining a hierarchy associated with a subset of semantic objects of the set of semantic objects included in the semantic catalogue. The subset of semantic objects includes a parent semantic object and one or more child semantic objects. Each child semantic object of the one or more child semantic objects further defines a feature of the parent semantic object.

Optionally, the defined semantic object is also mapped to another location of another code segment included in another executable source code. The other code segment shares a feature with the code segment defined within the executable source code.

In some implementations, a computer system includes one or more processors and a memory in communication with the one or more processors, the memory configured to store computer-executable instructions, wherein executing the computer-executable instructions causes the one or more processors to perform one or more of the steps of the method described above.

In some implementations, a computer-readable storage medium stores computer-executable instructions that, when executed, cause one or more processors of a computer system to perform one or more steps of the method described above.

DETAILED DESCRIPTION

Figure 1:
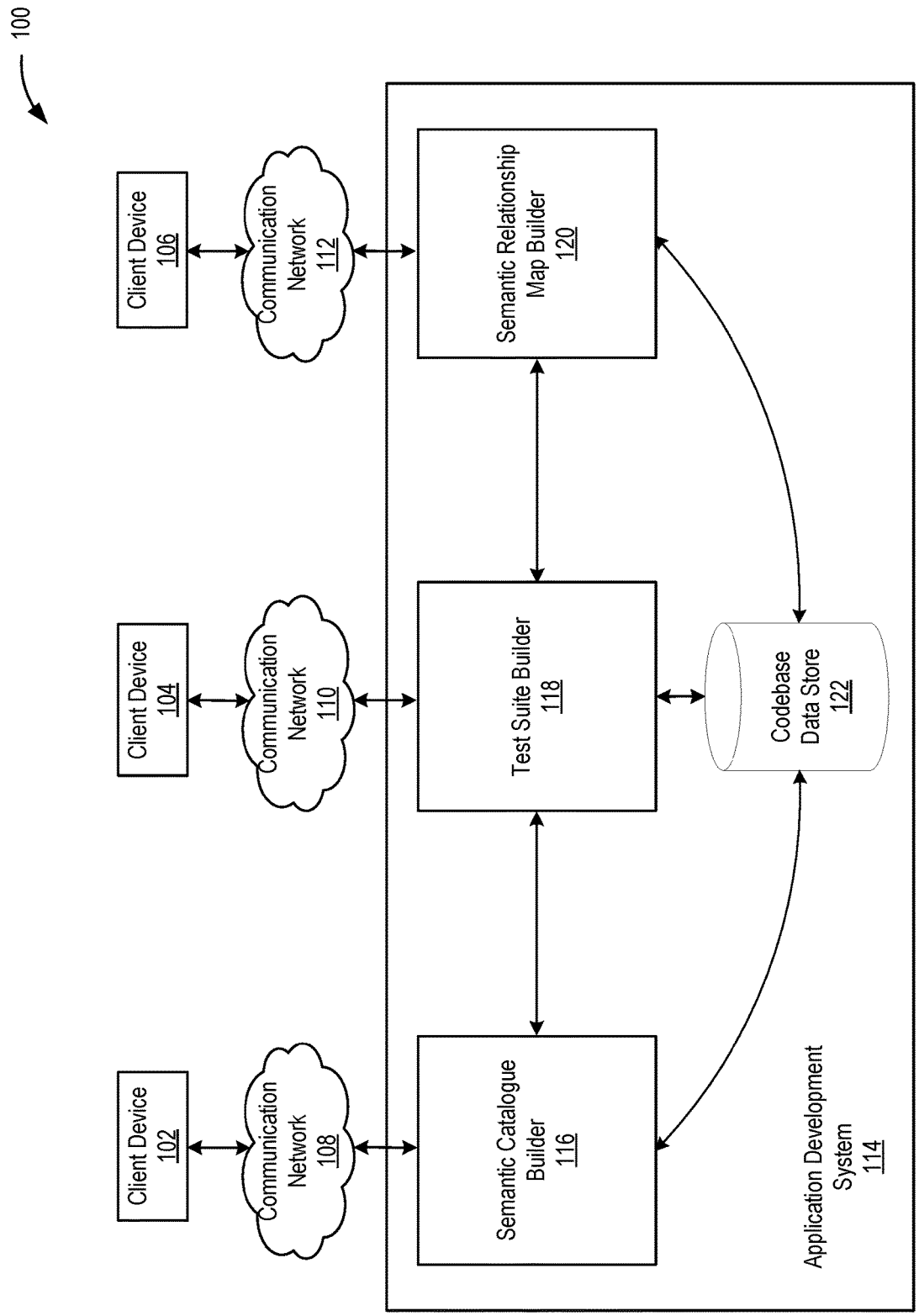
FIG. 1 is a block diagram illustrating an example of a network environment for tracking and testing source code modifications using a semantic catalogue, according to some aspects of the present disclosure.

Certain aspects and features of the present disclosure relate to techniques for building a semantic catalogue to track and test executable source code at a semantic level. A semantic object may include a user-defined representation of a semantic (e.g., a meaning or interpretation) characterizing at least a portion of syntax contained in a code segment (e.g., code that implements a function) of the executable source code. A semantic object may also include a mapping of a semantic characteristic to a location (e.g., a range of lines of the executable source code) of a particular code segment within the executable source code.

An application development system may track modifications made to the source code of an application at a semantic level. The application development system may track modifications made to a code segment associated with a semantic object by determining a delta between the prior version of the source code (e.g., before the modification is merged) and the modified source code (e.g., after the modification is committed and merged into the source code). The delta between the prior version of the source code and the modified version of the source code may be stored in a repository specific to the semantic object that is mapped to the code segment. The delta is captured and stored in the repository after each instance the source code is modified. The repository of deltas between two versions of the code segment represents the tracked modifications associated with the semantic object.

Additionally, the application development system may execute test suites to test modified source code for semantic errors or inconsistencies with semantic objects. The test suite configured using a semantic catalogue may expose a semantic relationship between two or more semantic objects. To illustrate and only as a non-limiting example, a semantic relationship may be exposed when executing Test #3 on source code causes Test #1 and Test #2 to fail. If Test #1 is designed to test the code segment associated with semantic object #1, Test #2 is designed to test the code segment associated with semantic object #2, and Test #3 is designed to test the code segment associated with semantic object #3, then a semantic relationship exists between semantic object #1 and semantic object #2 when executing Test #3 causes Tests #1 and #2 to fail. The identity of a semantic relationship may be useful in the context of debugging the executable source code.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

FIG. 1 is a block diagram illustrating a network environment 100 of a cloud infrastructure, according to some aspects of the present disclosure. In some implementations, the network environment 100 may include client devices 102, 104, and 106; communication networks 108, 110, and 112; and an application development system 114. Additionally, in some implementations, the application development system 114 may be configured to include a semantic catalogue builder 116, a test suite builder 118, and a semantic relationship map builder 120. Advantageously, certain implementations of the application development system 114 may be configured to track and/or test source code modifications at a semantic level. For example, certain implementations of the present disclosure advantageously provide the capability to test executable source code to ensure that, for example, the executable source code (or a modified version thereof) correctly implements a verified design of a distributed system. The network environment 100 illustrated in FIG. 1 is exemplary, and thus, the network environment 100 may include any number (including zero) of user devices, communication networks, and components of the application development system 114.

The client devices 102, 104, and 106 may be a portable handheld device (e.g., an iPhone®, cellular telephone, an iPad®, computing tablet, a personal digital assistant (PDA)), a wearable device (e.g., a Google Glass® head mounted display), or a non-portable computing device (e.g., a desktop computer or an electronic kiosk), running software such as Microsoft Windows Mobile®, and/or a variety of operating systems such as iOS, Windows Phone, Android, BlackBerry 8, Palm OS, and the like, and being Internet, e-mail, short message service (SMS), Blackberry®, or other communication protocol enabled. The client devices 102, 104, and 106 can be workstation computers running any of a variety of commercially-available UNIX® or UNIX-like operating systems, including without limitation the variety of GNU/Linux operating systems, such as for example, Google Chrome OS. Alternatively, or in addition, client devices 102, 104, and 106 may be any other electronic device, such as a thin-client computer, an Internet-enabled gaming system (e.g., a Microsoft Xbox gaming console with or without a Kinect® gesture input device), and/or a personal messaging device, capable of communicating over a network that can access the communication networks 108, 110, 112, and/or the Internet.

Client devices 102, 104, and 106 may be operated by any number of users, for example, a team of software developers that are geographically distributed across different locations. Additionally, as another example, client devices 102, 104, and 106 may be operated by users across different teams. To illustrate and only as a non-limiting example, client device 102 may represent one or more client devices operated by users associated with an application development team, whereas, client device 104 may represent one or more client devices operated by users associated with a quality assurance or testing team.

Communication networks 108, 110, and 112 facilitate communications between the various systems depicted in FIG. 1. Communication networks 108, 110, and 112 can be of various types and can include any number communication networks. Examples of communication networks 108, 110, and 112 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication networks 108, 110, and 112 may include any infrastructure that facilitates communications between the various systems depicted in FIG. 1.

The client devices 102, 104, and 106 may be configured to execute a client application, such as a web browser for accessing information on the Internet, a proprietary client application (e.g., Oracle Forms), or some other application, which may be operated by a user of the client device 102, 104, or 106 to interact with the application development system 114. By causing the client application to be executed, a user may operate any of client devices 102, 104, or 106 to request access to one or more resources, engage in authentication, modify server configurations, or interact with the application development system 114 for any other suitable purpose, such as to modify executable source code stored in a codebase data store 122. As an illustrative example, a user may operate client device 102 to access the semantic catalogue builder 116 to define semantic objects that are mapped to portions of the executable source code stored in the codebase data store 122. As another illustrative example, a user may operate client device 104 to access the test suite builder 118 to build test cases that test the executable source code for errors relating to semantic implementation, such as whether or not the executable source code correctly implements a verified design of a distributed system, or whether or not the executable source code correctly addresses a failure scenario for inserting packets into a data structure, such as a doubly-linked circular list.

The application development system 114 may be configured to provide capabilities to build, modify, and deploy one or more cloud-based services or applications. As a non-limiting example, the application development system 114 may be an extended integrated development environment that is configured to use a semantic catalogue to track and test source code modifications in terms of semantic definitions. Various different IaaS cloud-based services may also be provided. Examples include, without limitation, services that provide solutions for sales performance management, enterprise integration, and business flexibility for large organizations.

In some implementations, the semantic catalogue builder 116 may be an application configured to enable a user operating user device 102 to define a semantic object in terms of a granularity and a semantic characteristic. Further, the application enables the user to map the semantic object to a range of lines of code of one or more codebases that implements one or more applications. Mapping the semantic object to a range of lines of code (which may or may not be contiguous lines of code) in a codebase enables the application development system 114 to track any future modifications made to the code contained with the mapped range of lines of code. The semantic objects that are defined by the user may be stored in a data structure representing a semantic catalog of the semantic objects. The semantic catalogue of the full set of semantic objects associated with a particular codebase may represent the semantic scope of the codebase. A catalogued semantic object may include data representing a semantic (e.g., a meaning or interpretation) that characterizes the portion the executable source code (e.g., a code segment) to which the semantic object is mapped. In some examples, the semantic object may be a stored definition of the granularity and semantic characteristic attributed or assigned to the semantic object, and the lines of code to which the semantic object is mapped.

In some implementations, a semantic catalogue may be defined as follows: $\Psi=\{\psi_1, \psi_2, \ldots, \psi_n\}$ as the set of semantic objects (e.g., with a spatial semantic characteristic, a temporal semantic characteristic, a data semantic characteristic, and so on) that the executable source code of an application has been designed to handle. T may represent the semantic scope of an application.

In some implementations, the semantic catalogue builder 116 may receive input corresponding to a granularity and a semantic characteristic for a new semantic object. The semantic characteristic may be selected from a group of different semantic characteristics. Non-limiting examples of the various different semantic characteristics include at least a spatial semantic, a temporal semantic, a data semantic, a design semantic, a security semantic, and other suitable semantic characteristics. The various different semantics are described in greater detail with respect to FIG. 2 below. A granularity may refer to the level of abstraction of the semantic object. For example, the level of abstraction characterizing a system is higher than the level of abstraction characterizing a sub-system or component of the system. Further, the level of abstraction characterizing the sub-system of component is higher than the level of abstraction characterizing the source code (e.g., syntax) that implements the sub-system or component of the system. Thus, the granularity of a semantic object may refer to the level of abstraction of the system, sub-system, component, syntax, and so on, to which the semantic object is mapped. In these implementations, the semantic object may include a labels or tags representing the granularity and the semantic characteristic. In some implementations, the granularity and/or the semantic characteristic are not inputted by the user, but rather, the semantic catalogue builder 116 enables a user to define semantic objects with varying granularities and/or of different semantic characteristics. In these implementations, the semantic object may not include a label or tag representing the granularity or the semantic characteristic.

In some implementations, the semantic catalogue builder 116 may define a hierarchy of multiple semantic objects included in the semantic catalogue. The hierarchy of semantic objects may include, for example, a parent semantic object and one or more child semantic objects. A child semantic object may further define a feature or attribute of the parent semantic object. To illustrate and only as a non-limiting example, a parent semantic object may be mapped to a set of code segments relating to linked lists defined within the executable source code. A child semantic object may be mapped to a subset of the set of code segments relating to singly-linked lists, and another child semantic object may be mapped to a different subset of the set of code segments relating to doubly-linked lists.

In some implementations, the semantic catalogue builder 116 may store a semantic object that is mapped to a range of lines of code (e.g., lines 15-18) of a first codebase and also to a different range of lines of code (e.g., lines 41-44) of a second codebase, and so on. The code contained in the range of lines of code of the first codebase and the range of lines of code of the second codebase may correspond to the same function, such as the "insert( )" function for a doubly-linked circular list. The semantic object may store the mapping to each codebase. Additionally, tracking the modifications made to the portion of the source code included in the range of lines of each codebase may include determining, for each codebase, a delta between the prior version of the source code and the modified version of the source code, and storing the delta in a repository associated with the codebase. In other implementations, the deltas associated with the code across multiple codebases may be stored in a single repository associated with the semantic object.

In some implementations, the semantic catalogue builder 116 may be configured to define (either automatically or in response to user input) a semantic adjacency. For example, a first semantic object and a second semantic object of the same semantic catalogue may be semantically adjacent if both the first and second semantic objects are mapped to code segments in the same file (e.g., their corresponding code segments are included in the same executable code), are tracked using the same repository, and the code segments to which the two semantic objects are mapped are located in a spatially adjacent manner (e.g., next to each other) in the executable source code. When two semantic objects are defined as being semantically adjacent, the application development system 114 may enable a user to navigate to the different regions of the executable source code, different files, or different repositories associated with the first semantic object while modifying code associated with the second semantic object. In some implementations, the semantic catalogue builder 116 may be configured to receive input corresponding to a definition of a semantic complementary set, which is a set of semantic objects that are associated with different aspects of the same higher-level semantic. For example, a semantic complementary set may include a first semantic object mapped to code implementing a scenario of dividing by zero, a second semantic object mapped to code implementing a scenario of integer division, and a third semantic object mapped to code implementing a scenario of true division with a floating-point result.

In some implementations, a semantic adjacency may be defined as two semantic objects $[j_1, j_2, \ldots, j_m, \ldots, k_1, k_2, \ldots, k_n, \ldots l_1, l_2, \ldots, l_o, \ldots ]$ @ $f_1:r_1$, and $[J_1, J_2, \ldots, J_m, \ldots, K_1, K_2, \ldots, K_n, \ldots L_1, L_2, \ldots, L_o, \ldots ]$ @ $f_2:r_2$ belonging to a given semantic catalog when the following conditions are true:

$f_1$ is $f_2$;
$r_1$ is $r_2$;
$j_m+1==J_1$;
$k_n+1==K_1$; and
$l_o+1==L_1$, and so on, for all $f_1$, $f_2$, $r_1$, and $r_2$.

Further, once a semantic object is catalogued in the semantic catalogue, the application development system 114 may track any modifications made to the code contained in the range of lines to which the semantic object is mapped. To illustrate and as only a non-limiting example, the application development system 114 may track modifications made to a code segment by performing a GIT-diff command to determine the delta between the prior version of the source code (e.g., before the modification is merged) and the modified source code (e.g., after the modification is committed and merged into the source code). The delta between the prior version of the source code and the modified version of the source code may be stored in a repository specific to the semantic object that is mapped to the code segment. The delta is captured and stored in the repository after each instance the source code is modified. Any technique may be performed to determine the delta between two versions of source code, and thus, the present disclosure is not limited to performing the GIT-diff command.

Additionally, the test suite builder 118 may be an application that enables a user operating user device 102 to design and execute a test suite configured to test the executable source code for semantic errors or inconsistencies with respect to the semantic objects of a semantic catalogue. The test suite may include one or more test cases. For example, a test case may be an automated software test that is executed automatically by software test tools (e.g., SELENIUM and WINRUNNER, etc.) that can execute pre-scripted tests on the source code that implements an application. A test case can also be any set of test inputs, execution conditions, and expected results developed for a particular objective, such as to test for the correctness of a design element, to exercise a particular program path, or to verify compliance with a specific requirement. The outcome of a test case may include a success (e.g., indicating no issues with the tested source code) or a failure (e.g., indicating a bug or error).

In some implementations, executing a test suite configured by the test suite builder 118 may expose a semantic relationship between two or more semantic objects of a semantic catalogue. To illustrate and only as a non-limiting example, a semantic relationship may be exposed when executing Test #3 on source code causes Test #1 and Test #2 to fail. If Test #1 is designed to test the code segment associated with semantic object #1, Test #2 is designed to test the code segment associated with semantic object #2, and Test #3 is designed to test the code segment associated with semantic object #3, then a semantic relationship exists between semantic object #1 and semantic object #2, given the example above. In some implementations, semantic relationships may be automatically detected upon executing a test suite. For example, the semantic relationship map builder 120 may be an application configured to detect instances in which executing one or more test cases caused the failure of other test cases. In other implementations, a user may operate a user device (e.g., user device 106) to access the semantic relationship map builder 120 to define a semantic relationship between any two or more semantic objects of a given semantic catalogue.

Figure 2:
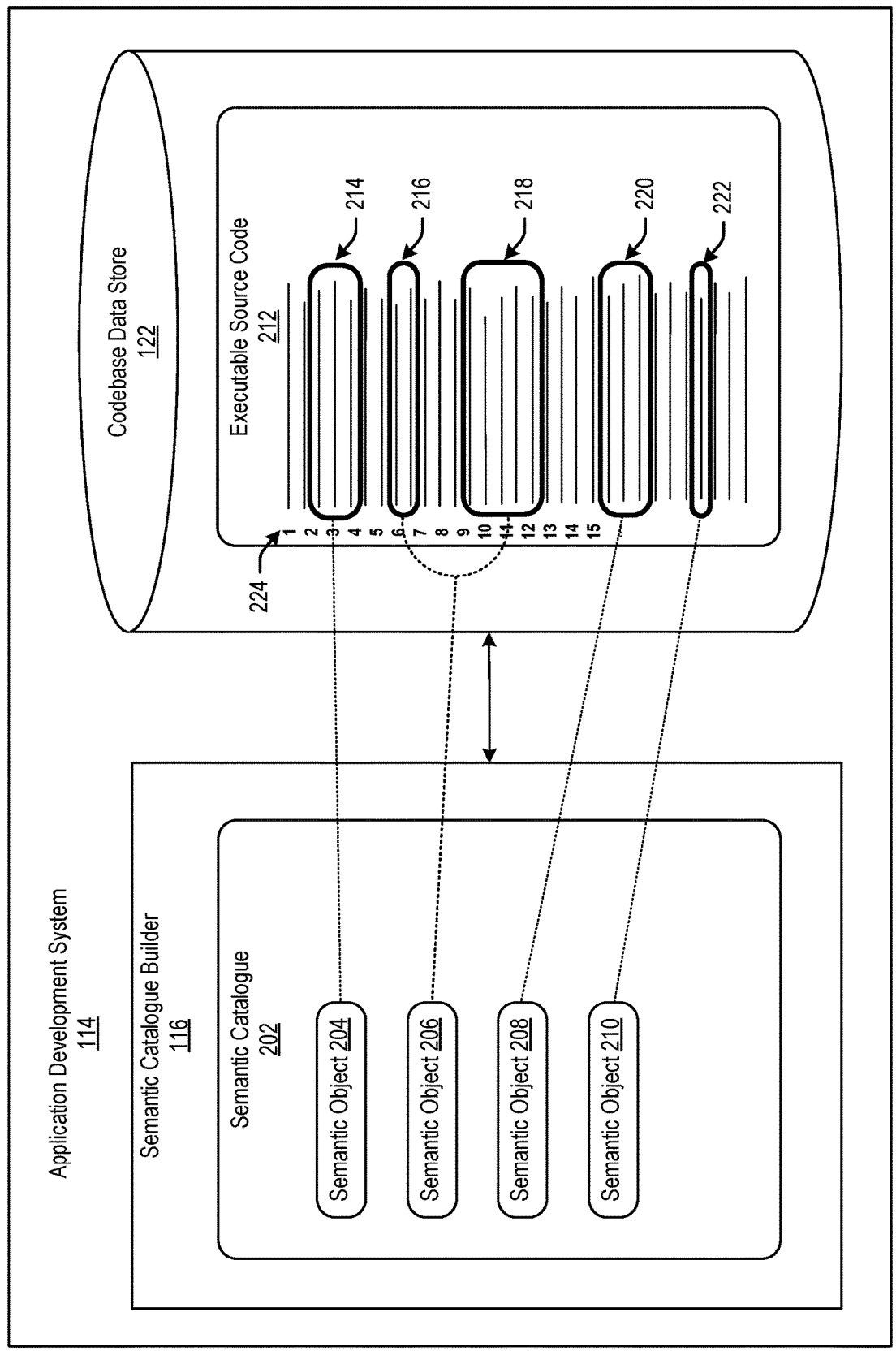
FIG. 2 is an illustration depicting an example of building a semantic catalogue for executable source code associated with an application, according to some aspects of the present disclosure.

FIG. 2 is an illustration depicting an example of building a semantic catalogue to represent the semantic scope of executable source code associated with an application, according to some aspects of the present disclosure. FIG. 2 illustrates an exemplary semantic catalogue builder 116, which includes a semantic catalogue 202 as a component, and an exemplary codebase data store 122, which stores an exemplary executable source code 212 that implements a cloud-based service. The exemplary semantic catalogue builder 116 and the exemplary codebase data store 122 may be components of the application development system 114. The executable source code 212 may include any number of code segments, including at least code segments 214 through 222. Each of code segments 214 through 222 may include the entirety or at least a portion of the code written to implement a function or service. Further, each of code segments 214 through 222 may be defined at a certain location within the executable source code 212. For example, code segment 214 includes code located between lines 2 through 5 of the executable source code 212; code segment 216 includes code located between lines 6 through 8; code segment 218 includes code located between lines 9 through 13; and so on (referencing line numbers 224).

In some implementations, the semantic catalogue builder 116 can enable a user to add new semantic objects or modify existing semantic objects. For example, the user may define (e.g., or assign to the new semantic object an attribute of) a granularity and a semantic characteristic for the new semantic object. Non-limiting examples of the various different semantic characteristics include at least a spatial semantic, a temporal semantic, a data semantic, a design semantic, a security semantic, and other suitable semantic characteristics. A granularity may refer to the level of abstraction of the semantic object. For example, the level of abstraction characterizing a system is higher than the level of abstraction characterizing a sub-system or component of the system, which itself is higher than the level of abstraction characterizing the source code that implements the sub-system or component of the system. Thus, the granularity of a semantic object may refer to the level of abstraction of the system, sub-system, component, syntax, and so on, to which the semantic object is mapped.

In some implementations, semantic objects characterized as having a spatial semantic characteristic may be defined as follows:

$S=\{[l_1, l_2, \ldots, l_m] @ f_1, [l_1, l_2, \ldots, l_n] @ f_2, \ldots, [l_1, l_2, \ldots, l_p] @ f_k\}$, where S is a semantic object have a spatial semantic characteristic; l is a range of lines (including single line) (e.g., lines 10-20, 35, and so on); and $f_i$ is a file, for any i. In some examples, a semantic object having a spatial semantic characteristic may be defined across multiple code repositories, as follows: $S=\{[l_1, l_2, \ldots, l_m] @ f_1:r_1, [l_1, l_2, \ldots, l_n] @ f_2:r_2, \ldots, [l_1, l_2, \ldots, l_p] @ f_k:r_k\}$, where S is a semantic object having a spatial semantic characteristic; $l_1$ is a range of lines (including a single line), such as 10-20, 35, and so on; $f_1$ is a file; and $r_1$ is a repository (e.g., a GIT repository), for any i. Additionally, in some examples, a semantic object may be characterized by a granularity. For example, a granularity may be defined as follows: $S_x^{+1}$, wherein $S_x^{-1}$ represents a one-level lower granularity, $S_x^{+n}$ represents an Nth level higher granularity, and $S_x^{-n}$ represents an Nth level lower granularity.

$U=\{S_1, S_2, \ldots, S_n\}$ may be the universe of the semantic objects having a spatial semantic characteristic for given executable source code of an application.

The code segment associated with a new semantic object $S_p$ having a spatial semantic characteristic may be introduced to an application. A subset of U (which may be equal to U or null) may be affected when $S_p$ is executed. Additionally, $\{S_i, S_j\}$ may be two semantic objects (each having a spatial semantic characteristic) that were affected by executing the code segment associated with the new semantic object $S_p$, and now have become $\{S_i', S_j'\}$. The $\Delta U$ may be $\{S_i', S_j'\}$, not including $S_p$ for the purposes of illustration. If $\#(\Delta U)==\#(U)$, then the execution of the code segment of the new semantic object $S_p$ may affect the executable source code (e.g., "#" may represent the number of elements in a semantic set). However, if $\Delta U==\{\}$, or $\#(\Delta U)==0$, then the execution of the new semantic object $S_p$ may be nugatory to the existing semantic objects with a spatial semantic characteristic. If $\#(\Delta U)<<\#(U)$, then the execution of the code segment associated with the new semantic object $S_p$ may have a narrow impact on the executable source code. If $\#(\Delta U) \approx \#(U)$, then the execution of the code segment associated with the new semantic object $S_p$ may have an extensive impact on the executable source code.

In some implementations, semantic objects characterized as having a temporal semantic characteristic may be defined as follows:

$T_{ji1}=(S_j, S_i, \Delta t_{ji1})$. The set of semantic objects having a temporal semantic characteristic for the executable source code of a given application may be defined as follows:

$U_T=\{(S_i, S_j, \Delta t_{ijx})$ for all $\{S_i, S_j\} \in U$, and for all x=1, 2, such that $\Delta t_{ijx}$ alters $S_j\}$, where U is the set of semantic objects having a spatial semantic characteristic that support concurrency in an application. In some examples, $U_T=(S_i, S_j, \ldots, S_q, \Delta t_{ijx})$, which may be in a tuple, if the semantic objects are related temporally.

In some implementations, semantic objects characterized as having a data semantic characteristic may be defined as follows:

$D=\{S_{dn}, S_{de1}, S_{de2}, \ldots, S_{den}\}$. The semantic objects may be mapped to code segments that implement code for certain scenarios, such as sunny day scenarios and failure scenarios or edge cases. In some examples, D may provide the logic of an application or functions of the application.

The semantic objects 204 through 210 illustrate at least some of the various different semantic characteristics that are attributable to a semantic object. The semantic object 204 may be defined as having a spatial semantic characteristic because the code segment 214 includes logic of a particular operation distributed across one or more regions of the executable source code 212. For example, the code segment 214 may include code configured to perform a particular function. The code may be distributed across adjacent locations in the same set of files as code to perform another service (e.g., as in the case of an elastic-search docker and a cron docker). As another example, logic included in the code segment 214 may be modified to resolve a bug in a set of locations in a set of files across one or more codebases. The set of all other spatial locations in the files that get affected by this modification represents the spatial semantic characteristic of the semantic object associated with the source code modification. As yet another example, a spatial semantic characteristic may be defined as the set of locations in files of code elements that are related, such as implementing the code for handling a sunny-day scenario, code for handling a failure scenario, and so on, as determined by a developer. In some examples, the granularity of a semantic object with a spatial semantic characteristic may be selected to make the semantic object useful in troubleshooting the code segment 214.

The semantic object 206 may be defined as having a temporal semantic characteristic because the output of executing the code segment 216 at a given time influences the input of a function implemented by code segment 218 executed at a later time. A temporal semantic characteristic may represent how a function's behavior is altered due to different events occurring at different times. For example, a temporal semantic characteristic exists when two code segments (e.g., code segment 216 and 218) are executed at different times, with the output of code segment 216 affecting the input of the code segment 218. As another example, a temporal semantic characteristic exists when race conditions exist, such as when concurrent processes read and update the same variable without using a lock. As yet another example, two code segments 216 and 218 of the same or different executable source code are executed in two different ways with respect to time. For example, the code segment 216 can be executed first, and then after a time period (e.g., Δt), the code segment 218 is executed. If the code segment 218 (or if the function implemented by the code segment 218) is not altered by the execution of the code segment 216, then no temporal semantic characteristic exists between the semantic objects of the code segments 216 and 218. However, if the code segment 218 (or if the function implemented by the code segment 218) is altered by the execution of the code segment 216, then a temporal semantic characteristic does exist between the semantic objects of the code segments 216 and 218. In some examples, a temporal semantic characteristic can exist across more than two semantic objects in a tuple. To identify the concurrent code segments included in the executable source code 212 that exhibit the spatial semantic characteristic, the semantic catalogue builder 116 may perform a state analysis between two or more code segments after each runtime iteration.

The semantic object 208 may be defined as having a data semantic characteristic because the code segment 220 (or at least a portion thereof) may contain the input parameters to a function. The data semantic characteristic of the semantic object 208 can be defined as the set of edge cases as well as the normal case (e.g., sunny-day scenario) case that necessitates creation of code to handle the edge cases. For example, the semantic object 208 is mapped to the code segment 220, which includes code for addressing a normal scenario (e.g., a sunny-day scenario), a failure scenario, and so on with respect to the input parameters.

Anyone of semantic objects 204 through 210 may also be defined having a design element semantic characteristic. For example, a design element semantic characteristic may be defined or attributed to semantic objects that are mapped onto code segments written to implement a design principle or element of a distributed system, such as handling failure scenarios, ensuring clients and servers are configured to handle unresponsive senders or receivers, minimizing data traffic and latency, and other suitable design elements. Any one of code segments 214 through 222 may include code written to implement a system design or a design element of a distributed system.

The semantic object 210 may be defined as having a security semantic characteristic because the code segment 222 (or at least a portion thereof) may contain code relating to security features. In some implementations, the semantic catalogue can be used to track how security features are implemented in the executable source code of an application. Additionally, in some implementations, semantic-oriented testing can be performed on an application to determine whether the application correctly implements the code segments associated with the security semantic characteristic or other semantic characteristics. Non-limiting examples of code segments associated with the security semantic characteristic include code segments that implement security features, such as preventing injection flaws, preventing sensitive data exposure, preventing insecure deserialization, preventing buffer overruns, and other suitable security features.

Any other suitable semantic characteristics may be attributed to a semantic object. Table 1 below shows non-limiting examples of other semantic characteristics.

TABLE 1

| Non-Limiting Examples of Semantic Characteristics | Description |
| --- | --- |
| Empty Object/ Null State | This semantic characteristic characterizes code segments that check for empty object/null state (e.g., 'None' state in Python) before accessing an object's attribute or property, before performing an object's operations (e.g., function(s) of the code segment), or before using a variable. |
| Resource Management | This semantic characteristic characterizes code segments that close a resource upon completion, unless a built-in resource management construct is used (e.g., 'with' statement in Python). |
| Resource Locks | This semantic characteristic characterizes code segments that prevent a resource from being modified when currently read or accessed by another thread or user process. Resource locks may be executed when concurrency is involved. When concurrency is not involved, this semantic characteristic characterizes code segments that create a new resource by copying the original resource and modifying the copy rather than the original to preserve the original record's state. |
| Index Past Bounds | This semantic characteristic characterizes code segments that check if an index has exceeded its bounds, for example, in a list. |
| Data Representation and Initialization | This semantic characteristic characterizes code segments that represent and initialize data. |
| Data Manipulation | This semantic characteristic characterizes code segments that manipulate data. |

TABLE 1-continued

| Non-Limiting Examples of Semantic Characteristics | Description |
| --- | --- |
| Variables/Object States | This semantic characteristic characterizes code segments that check the state of an object or variable (e.g., the value(s) of the object or variable) before performing manipulations on it. |
| Loop Data Structure(s) Initialization | This semantic characteristic characterizes code segments that initial data structure(s) used in a loop, including the loop control variable(s), before a loop is created. |
| Loop Progression | This semantic characteristic characterizes code segments that check to ensure that every iteration of a loop effects a change in the loop control variable(s), such as, increment, decrement, and so on. |
| Loop Termination | This semantic characteristic characterizes code segments that check to ensure every loop has a termination condition after a finite number of iterations. |
| Loop Invariants | This semantic characteristic characterizes code segments that handle the conditions that remain true before and after each iteration of a loop. |
| Recursion Base Case(s) and Recursion Termination | This semantic characteristic characterizes code segments that handle the conditions of terminating a recursion. |
| Recursion Progression | This semantic characteristic characterizes code segments that check to ensure that recursion variable(s) delta moves towards a recursion base case(s). |
| Memoization | This semantic characteristic characterizes code segments that store recursion results in a variable for later use, avoiding re-computations. |
| Item Existence | This semantic characteristic characterizes code segments that check if an item already exists in a collection (such as a list, set, dictionary, stack, etc.) before adding to the item to the list. |
| Duplicate Dictionary (or any Collection) | This semantic characteristic characterizes code segments that handle altering a dictionary (or any collection) during an iteration by altering a copy or duplicate while using the original for the iteration. |
| Loop Multiple Cases | This semantic characteristic characterizes code segments that check to ensure the loop progression and loop termination semantics hold for all cases, if a loop has multiple cases. |
| Mutually Exclusive Cases | This semantic characteristic characterizes code segments that check if mutually exclusive cases of a variable's or object's state or other scenarios, such as events, need to be handled. If so, the 'switch' statement may be executed to handle such cases. In Python, the "if...elif...elif...else..." construct may be used, which may be equivalent to the 'switch' statement construct. |
| Semantic Coding | This semantic characteristic characterizes code segments that check to ensure every semantic of a problem is satisfied at the semantic or logical level of the abstraction or pseudo code before starting to code in a programming language. |
| Complement | This semantic characteristic characterizes code segments that create a new collection minus an item (list - item) for checking a complement's existence of the item in a collection (e.g., a list). The 'copy.deepcopy( )' statement in Python may be executed for creating the new collection so as to not affect the original. |
| Indexing, Slicing, and Range | This semantic characteristic characterizes code segments that check if the indexing, slicing, and range follows the [a, b) = [a, b-1] semantic. |
| Doubly-linked Circular List | This semantic characteristic characterizes code segments that handle various scenarios relating to doubly-linked circular lists, such as, for example, the following four scenarios:<br>a. When a doubly-linked circular list is empty.<br>b. When a doubly-linked circular list has exactly one node.<br>c. When a doubly-linked circular list has exactly two nodes.<br>d. When a doubly-linked circular list has two or more nodes.<br>The above four semantics may be applied for every function of the doubly-linked circular list class, such as insert( ), delete( ), traverse( ), etc. |
| Tree Data Structures | This semantic characteristic characterizes code segments that handle various scenarios relating to tree data structures, such as, for example, the following four scenarios:<br>a. An empty tree.<br>b. A tree node that has no children.<br>c. A tree node that has one child.<br>d. A tree node that has two children.<br>In the case of a tree-to-list conversion program, null children of nodes may be saved as 'null' (string data type), assuming 'null' is not a valid node data. |
| Global Objects or Variables | This semantic characteristic characterizes code segments that check to ensure global object(s) or variable(s) are not used in recursive functions, unless the global object(s) or variable(s) are re-initialized between recursive function calls, which may result in the global object(s)/variable(s) accumulating unnecessary data. |
| Recursion | This semantic characteristic characterizes code segments that check to ensure that generic calculations or processing code are not used in recursive functions. |
| Bash Pipeline | This semantic characteristic characterizes code segments that check to ensure that, when using a bash pipeline, the PIPESTATUS array variable is used to get the exit status of the relevant command(s) of the pipeline. |
| Non-empty Item Addition | This semantic characteristic characterizes code segments that checks if an item of a collection (e.g., a list, set, dictionary, stack, etc.) is non-empty before adding the item to the list. |
| Configuration Variable | This semantic characteristic characterizes code segments relating to the configuration of hosts, virtual machines (VMs), and docker containers. |
| Process/Service Status | This semantic characteristic characterizes code segments relating to processes/services, such as Rsyslogd, Elastic Search [ES]. Further, the code segments may relate to running or stopping the hosts, virtual machines (VMs), and docker containers. |
| Ports: UDP vs. TCP (or other port types) | This semantic characteristic characterizes code segments relating to sending packets to the wrong port or using the wrong transport (layer 4), causing data transmission to fail. |
| Disk Space | This semantic characteristic characterizes code segments relating to or addressing high disk utilization, which slows down an application. |
| Docker Container Image | This semantic characteristic characterizes code segments relating to a cron docker container with a base Linux slim image, in which cron scheduler does not operate. Once the cron docker container is changed to use a base Linux full image, the cron scheduler may operate correctly. |

Figure 3:
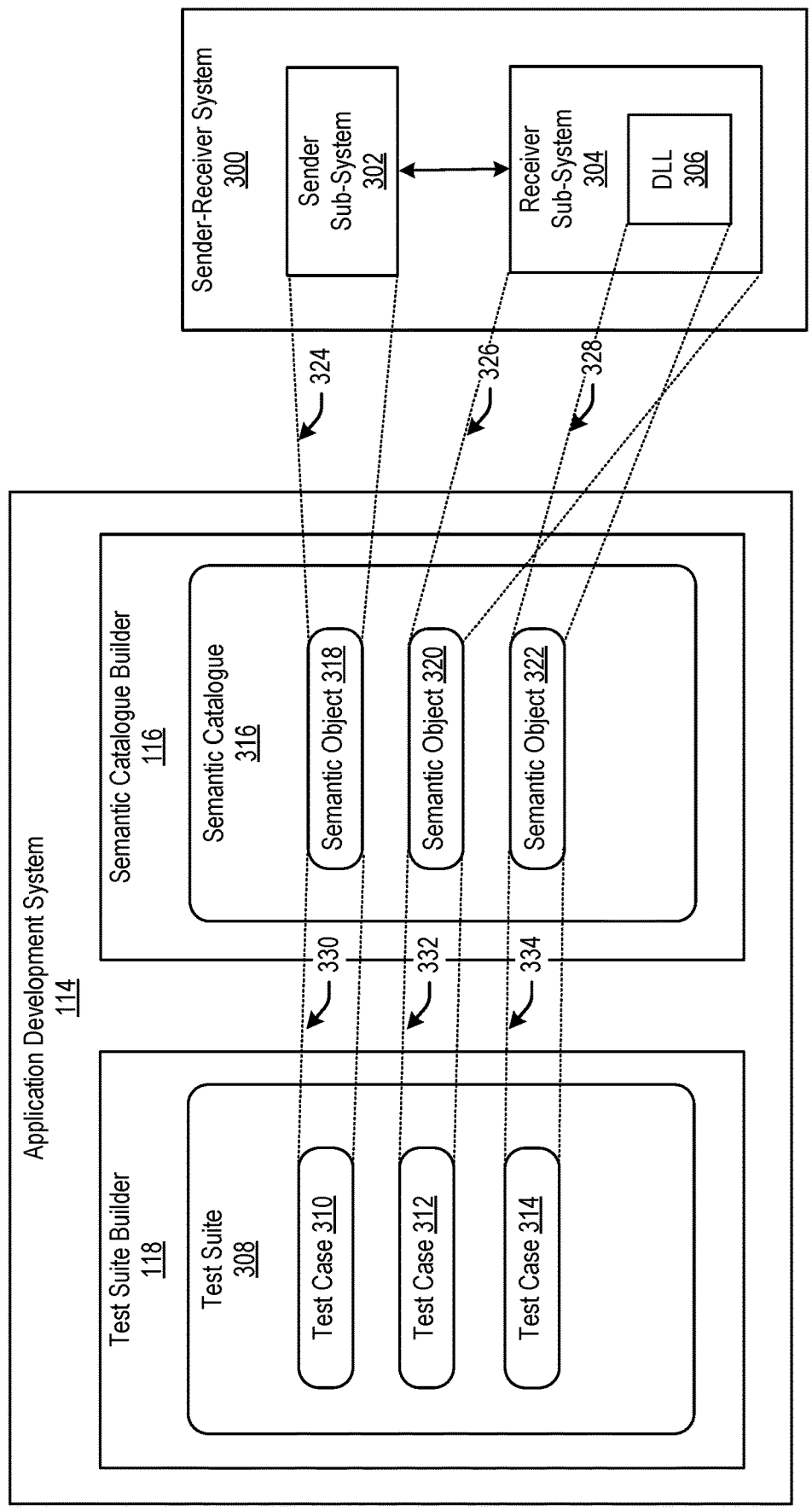
FIG. 3 is an illustration depicting an example of building a test suite for testing a sender-receiver system, according to some aspects of the present disclosure.

FIG. 3 is an illustration depicting an example of building a test suite 308 for testing a sender-receiver system 300, according to some aspects of the present disclosure. FIG. 3 illustrates an exemplary sender-receiver system 300 associated with a test suite 308 and a semantic catalogue 316. Sender-receiver system 300 is implemented using executable source code. Further, sender-receiver system 300 includes a sender sub-system 302 and a receiver sub-system 304. Packets of data may be transmitted from the sender sub-system 302 to the receiver sub-system 304. The receiver sub-system 304 may include a buffer for storing the incoming packets of data. As illustrated in FIG. 3, the buffer of the receiver sub-system 304 is implemented using a doubly-linked circular list data structure 306 (denoted as "DLL" in FIG. 3).

Four semantic objects may be defined to represent the various scenarios associated with the doubly-linked circular list data structure 306. A first semantic object defines the scenario that occurs when the doubly-linked circular list is empty. A second semantic object defines the scenario that occurs when the doubly-linked circular list has only one node. A third semantic object defines the scenario that occurs when the doubly-linked circular list has only two nodes. A fourth semantic object defines the scenario that occurs when the doubly-linked circular list has two or more nodes. The four semantic objects may be defined by a user for each function of the doubly-linked circular list class, such as the "insert( )" function, the "delete( )" function, the "traverse( )" function, and so on.

To illustrate and only as a non-limiting example, the receiver sub-system 304 executes an "insert( )" function to store incoming packets from the sender sub-system 302 in its doubly-linked circular list data structure 306. Further, the receiver sub-system 304 executes a "delete" function when an application consumes a packet stored in the doubly-linked circular list data structure 306.

A semantic catalogue 316 is defined to represent multiple semantic objects of the executable source code that implements the sender-receiver system 300. The semantic catalogue 316 includes semantic object 318, semantic object 320, and semantic object 322. Semantic object 318 includes a mapping 324 to the portion of the executable source code that implements the sender sub-system 302. Further, the semantic object 318 is attributed with a spatial semantic characteristic and with a high-level granularity. The semantic object 320 includes a mapping 326 to the executable source code that implements the receiver sub-system 304. Further, the semantic object 320 is also attributed with a spatial semantic characteristic and with a high-level granularity. Lastly, the semantic object 322 includes a mapping 328 to the portion of the executable source code that implements the doubly-linked circular list data structure 306. Further, the semantic object 322 is also attributed with a spatial semantic characteristic and with a low-level granularity. The semantic object 322 (mapped to the doubly-linked circular list data structure 306) has a lower granularity than the semantic object 320 (mapped to the receiver sub-system 304) because the doubly-linked circular list data structure 306 is a lower-level component of the receiver sub-system 304.

Given the semantic catalogue 316, which characterizes the semantic scope of the sender-receiver system 300, a user (e.g., a quality assurance or testing engineers) may define a test suite 308. The test suite 308 may include test case 310, test case 312, and test case 314. The test case 310 is designed to test the sender sub-system 302. Thus, the test case 310 is mapped onto the semantic object 318 (indicated by mapping 330), which itself is mapped onto the portion of the executable code that implements the sender sub-system 302. The test case 310 causes the sender sub-system 302 to send 'x' number of packets to the receiver sub-system 304. The test case 310 compares the 'y' number of packets received and stored at the receiver sub-system 304. The test case 310 succeeds if the 'x' number of packets transmitted by the sender sub-system 302 equals the 'y' number of packets received at the receiver sub-system 304; otherwise, the test case 310 fails, thereby indicating an error. The test case 312 is designed to test the receiver sub-system 304. Thus, the test case 312 is mapped onto the semantic object 320 (indicated by mapping 332), which itself is mapped onto the portion of the executable code that implements the receiver sub-system 304. The test case 312 checks if there are any failures in the "insert( )" function that saves incoming packets from the sender sub-system 302 in the doubly-linked circular-list data structure 306, which is a component of the receiver sub-system 304.

In some implementations, the test cases designed for a given application may be defined as follows: $T_1=\{S_1\}$, and $T_2=\{S_2\}$, where $T_1$ and $T_2$ are each test cases. A test suite may then be defined as follows: $\tau=\{T_1, T_2\}$.

The semantic object 322 is mapped to the portion of the executable source code of the "insert( )" function that defines the scenario occurring when the doubly-linked circular list data structure 306 of the receiver sub-system 304 is constrained to a finite buffer size. The portion of the executable source code that defines this scenario checks if the size of the packets in the doubly-linked circular list data structure 306 plus that of an incoming packet exceeds the finite buffer size of the doubly-linked circular list data structure 306. If the finite buffer size is exceeded, then the incoming packet is discarded; otherwise, the incoming packet is accepted and stored in the doubly-linked circular list data structure 306. However, a packet discard is considered a failure in test case 312 (e.g., the test case testing the "insert( )" function of the receiver sub-system 304). The semantic object 322 is attributed with a lower granularity than the semantic object 320 because the doubly-linked circular list data structure 306 is a lower-level component of the receiver sub-system 304. The test case 314 is defined to cause the sender sub-system 302 to transmit a packet that will exceed the finite buffer size.

Executing test case 314 causes each of test cases 310 and 312 to fail because the 'x' number of packets transmitted by the sender sub-system 302 would not equal to the 'y' number of packets received and stored at the receiver sub-system 304 (thereby indicating a failure of test case 310). Additionally, the "insert( )" function of the receiver sub-system 304 would experience an error due to the intentionally discarded packet caused by test case 314 (thereby indicating a failure of test case 312). Thus, executing test case 314 exposes a semantic relationship between the semantic object 318 (mapped to the sender sub-system 302) and the semantic object 320 (mapped to the receiver sub-system 304). Further, a semantic relationship can be exposed by executing a test suite defined for the semantic catalogue of an application's source code. Additionally, in some implementations, the test suite 306 may be a regression test suite if executing the test suite exposes all of the semantic relationships that exist in the semantic catalogue 316. In some implementations, a test case can be configured to test for the correctness of a verified design element. In some implementations, a semantic relation tion map may be defined using the semantic relationship map builder 120 to indicate the detected semantic relationships exposed after executing the test suite 308.

In some implementations, a semantic relationship may be defined as follows: $\rho=(S_1, S_2)$, where $S_1, S_2 \in \Psi$. Additionally, a semantic relationship map may be defined as follows: $\mu=\{\rho_1, \rho_2, \ldots, \rho_n\}$, over $\Psi$.

Figure 4:
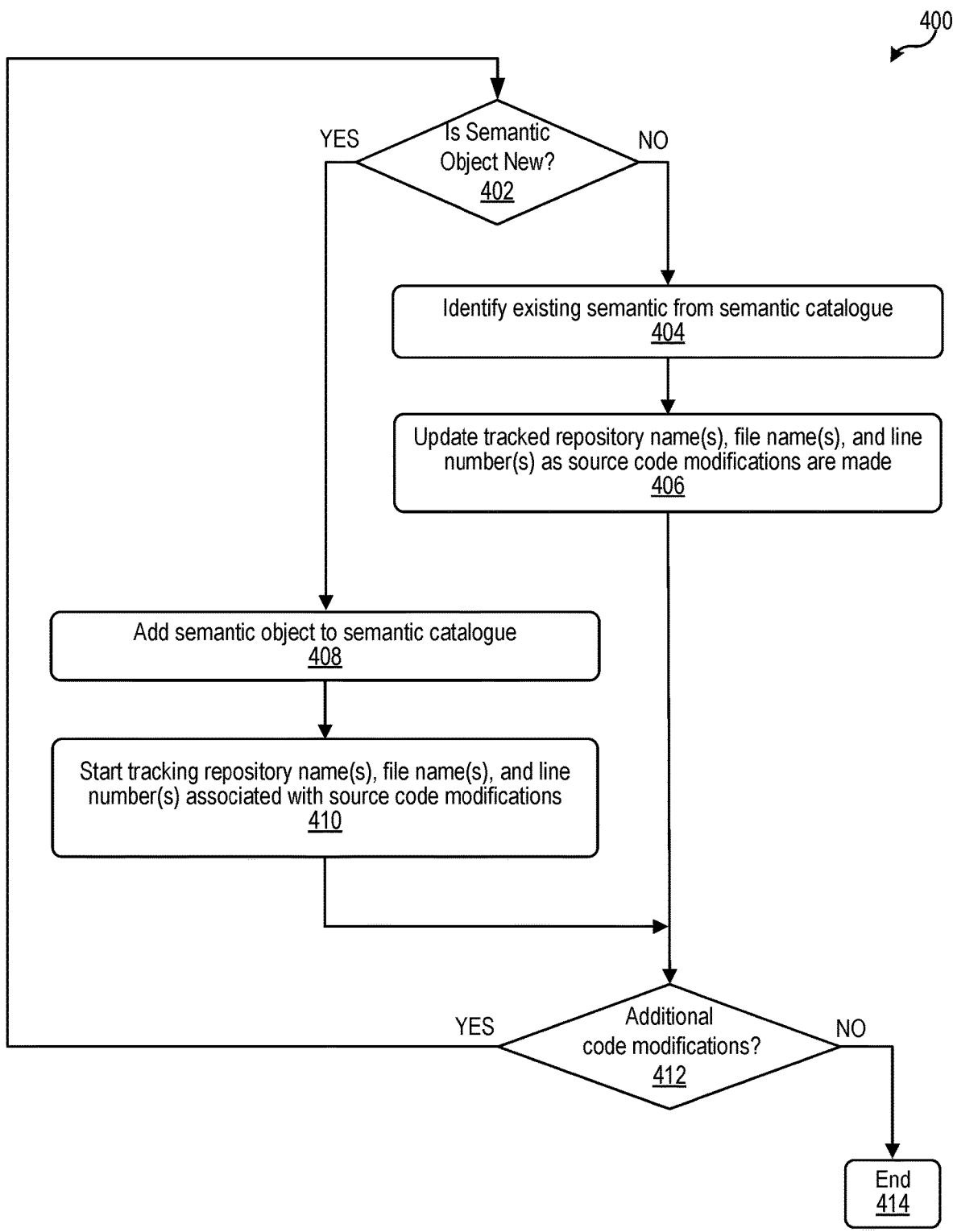
FIG. 4 is a flowchart illustrating an example of a process for building a semantic catalogue, according to some aspects of the present disclosure.

FIG. 4 is a flowchart illustrating an example of a process for building a semantic catalogue, according to some aspects of the present disclosure. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. The operations of the process 400 can be implemented as hardware circuitry and/or stored as computer-readable instructions on a non-transitory computer-readable medium of a computer system, such as the semantic catalogue builder 116, the test suite builder 118, or the semantic relationship map builder 120 illustrated in FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

At block 402, the semantic catalogue builder 116 may determine whether a given semantic object (or a yet-to-be-defined semantic object) is new to an existing semantic catalogue. In some implementations, an interface may be presented to a user. The interface may be displayed on a user device by executing interface data stored at a web or application server associated with the semantic catalogue builder 116. The interface may be configured to enable a user to define one or more semantic objects using the semantic catalogue builder 116, and thereby build a semantic catalogue associated with one or more codebases. For example, to perform block 402, the interface may prompt the user to input whether or not a given semantic object is new to a given semantic catalogue. Depending on the user input received at the interface, the process 400 may proceed to block 404 or block 408.

When the input received at the interface corresponds to an indication that the semantic object is not new to the given semantic catalogue (e.g., the "NO") branch, then the process proceeds to block 404. At block 404, the semantic catalogue builder 116 may identify the semantic object from amongst the set of semantic objects included in the semantic catalogue. For example, the interface may prompt the user to identify the semantic object by inputting an identifier or name of the semantic object (e.g., "empty_doubly_linked_list"). At block 406, the semantic catalogue builder 116 may track any modifications made to the code segment that is mapped to the semantic object identified at block 404. To illustrate and only as a non-limiting example, if at block 404, the user identifies a semantic object mapped to lines 15-18 of source code, which defines the scenario that occurs when the doubly-linked circular list is empty, then at block 406, the semantic catalogue builder 116 may track any modifications made to lines 15-18 of the source code.

In some implementations, tracking the modifications made to lines 15-18 may include extending an integrated development environment (IDE) to track modifications made to source code and to maintain the semantic catalogue. The extended IDE may be configured to track the modifications made to source code using, for example, GIT, for modifications that have been committed and merged into the source code. The extended IDE can be configured to catalog semantic objects and track any modifications made to the code segments associated the catalogued semantic objects in a repository. For example, tracking modifications made to the code segment associated with a semantic object can include tracking the spatial location (e.g., lines of code in files) of the code segment as other new code is added, modified, or removed from the executable source code. To illustrate and as a non-limiting example, if a new code segment defining a "delete" function for the doubly-linked circular list is inserted to the executable source code at lines 12-13, then the existing lines 15-18, which define the scenario that occurs when the doubly-linked circular list is empty, will move to lines 17-20. The extended IDE can track that the semantic object is now mapped to lines 17-20, instead of lines 15-18, in a repository (e.g., a GIT repository). When the user selects the semantic object that is mapped on to the code segment at lines 15-18 from the semantic catalogue stored at the extended IDE, then the extended IDE may track any modifications made to the code lines associated with the selected semantic object.

Referring again to the decision performed at block 402, the process 400 proceeds to block 408 when the input received at the interface indicates that the user is adding a new semantic object to the semantic catalogue. Adding a new semantic object to the semantic catalogue may include receiving (at the interface) a new code segment and one or more line numbers of the executable source code at which the new code segment is to be inserted. At block 410, after the new semantic object is added to the semantic catalogue, the semantic catalogue builder 116 may create a repository for tracking any changes made to the new code segment, including any line number changes imposed on the new code segment when new code is added or removed elsewhere in the source code. In some implementations, the repository tracks a difference between the modified source code after the modification is merged into the source code and the previous version of the source code (e.g., before the modification was merged into the source code) using, for example, a git-diff command. At block 412, the interface may prompt the user to indicate whether or not there are any additional code modifications. If "YES," then process 400 returns to block 402. If "NO," then the process 400 ends at block 414.

Figure 5:
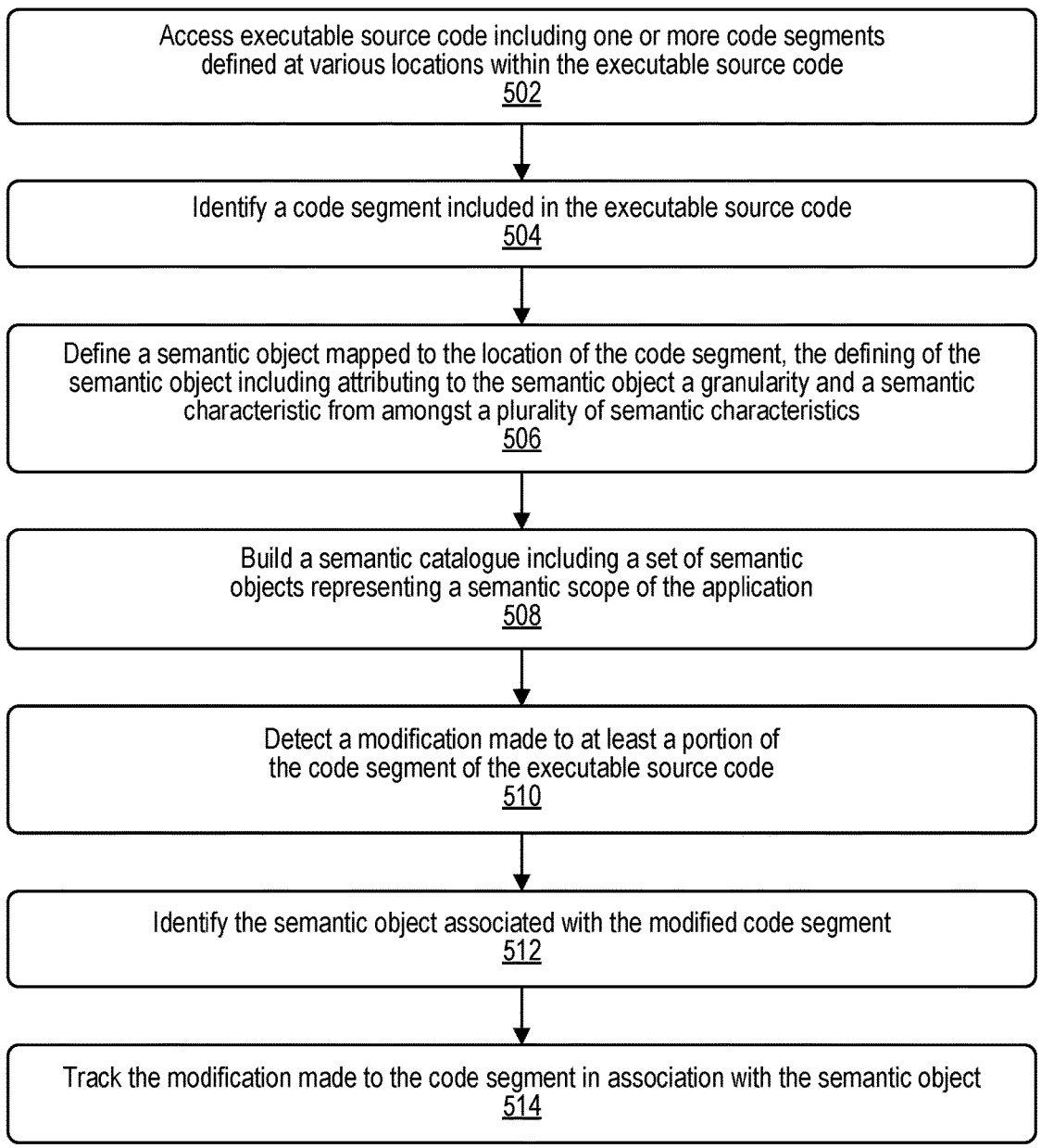
FIG. 5 is a flowchart illustrating an example of a process for tracking modifications to executable source code, according to some aspects of the present disclosure.

FIG. 5 is a flowchart illustrating an example of a process 500 for tracking modifications to executable source code, according to some aspects of the present disclosure. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. The operations of the process 500 can be implemented as hardware circuitry and/or stored as computer-readable instructions on a non-transitory computer-readable medium of a computer system, such as the semantic catalogue builder 116, the test suite builder 118, or the semantic relationship map builder 120 illustrated in FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

At block 502, the semantic catalogue builder 116 may access executable source code of an application. The executable source code, when executed, may provide the application to end users. The executable source code may include any number of code segments. For example, a code segment may include one or more lines of source code that represent a function or a portion of a function. A code segment of the executable source code may be defined at a location within the executable source code. For example, a location of a code segment may be a range of line numbers (e.g., code lines 15-22 in a file) of the executable source code.

At block 504, the semantic catalogue builder 116 may identify a code segment from the various code segments included in the executable code segment. For example, the code segment may be identified based on user input. At block 506, the semantic catalogue builder 116 may receive input from a user device operated by a user. The input may correspond to a request to define a semantic object that is mapped to the code segment identified at block 504. In response to receiving the input, the semantic catalogue builder 116 may enable the user to define the semantic object by defining or attributing a granularity and a semantic characteristic to the semantic object. The semantic characteristic may be selected from a plurality of semantic characteristics. As a non-limiting example, the semantic characteristic of a semantic object may be a spatial semantic, a temporal semantic, a data semantic, or a security semantic.

Additionally, the granularity of a semantic object may represent the level of abstraction of the semantic object. For example, the level of abstraction of a semantic object that is mapped to source code implementing a receiver sub-system in a sender-receiver system is characterized by a higher level of abstraction than a semantic object that is mapped to source code implementing the "insert" function of a doubly-linked list of the receiver sub-system. As another example, the level of abstraction of syntax in source code is lower (e.g., finer granularity) than the level of abstraction of code changes saved to a repository using a git-commit command.

At block 508, the semantic catalogue builder 116 may build (e.g., generate or create) a semantic catalogue including the semantic object defined at block 506. In some examples, the semantic catalogue may not include other existing semantic objects at the time the semantic object is defined in block 506. In other examples, the semantic catalogue may include a set of semantic objects that represent the semantic scope of the executable source code.

At block 510, the semantic catalogue builder 116 may detect a modification made to a code segment defined within the executable source code. For example, an extended IDE may be configured to detect and track modifications made to source code with respect to a catalogued semantic object that is mapped to the modified code segment. At block 512, the semantic catalogue builder 116 may identify the semantic object that is mapped to the code segment associated with the source code modification detected at block 510. At block 514, the semantic catalogue builder 116 may track the modification made to the code segment in a repository (e.g., a file) specifically associated with semantic object. The repository can store any code changes using, for example, GIT to capture or track the source code modification that has been committed or merged into the source code.

In some implementations, test suite builder 118 may execute a suite of test cases to detect errors in the source code or inconsistencies with a semantic object. For example, a test suite may include a plurality of test cases. The plurality of test cases may include a first test case, which is mapped to a first semantic object of the semantic catalogue, and a second test case, which is mapped to a second semantic object of the semantic catalogue. Each test case of the plurality of test cases included in the test suite may be executed by the test suite builder 118. The test suite builder 118 may detect that, upon executing the first test case, an outcome of the second test case indicates a failure. In this situation, the test suite builder 118 may define a semantic relationship between the first semantic object and the second semantic object due to the impact of the execution of the first test case on the second test case.

A semantic relationship map may be defined by and stored at semantic relationship map builder 120. For example, semantic relationships between two or more semantic objects can be exposed by executing a test suite defined for the semantic scope of a particular application. In some implementations, a semantic relationship map may be a data structure built to store associations between two or more semantic objects, indicating a semantic relationship. In some implementations, a semantic relationship map may be a dictionary (e.g., implemented in Python) with keys denoting a relationship name and/or label, while values denote the related semantic characteristics as tuples (2-tuples or n-tuples).

A bug may be defined in terms of a semantic object. In some implementations, a bug within the executable source code may be detected when executing a code segment results in an inconsistency associated with the semantic characteristic assigned to the code segment. For example, a semantic object may represent a design element of an application. In other implementations, a bug may be detected when an input parameter passed into the code segment is inconsistent with the set of semantic objects included in the semantic catalogue. For example, a bug may be detected due to inputting or passing as argument a new semantic, which the executable source code is not designed for (e.g., the input or argument is not included within the semantic scope of the source code).

The plurality of semantic characteristics may include, for example, a spatial semantic, a temporal semantic, a data semantic, a design element semantic, and a security semantic. Other suitable semantics may be used to characterize one or more code segments of source code. The spatial semantic may represent logic of a function defined at a particular location within the executable source code. The temporal semantic may associate a first semantic object with a second semantic object when the output of the first semantic object affects the input of the second semantic object. The design element semantic may represent a design feature of a portion of the executable source code. The data semantic may represent a semantic of an input parameter to a given code segment attributed as the spatial semantic. In some implementations, the semantic catalogue can be used to track how security features are implemented in the executable source code of an application. Additionally, in some implementations, semantic-oriented testing can be performed on an application to determine whether the application correctly implements the code segments associated with the security semantic characteristic or other semantic characteristics. Non-limiting examples of code segments associated with the security semantic characteristic include code segments that implement security features, such as preventing injection flaws, preventing sensitive data exposure, preventing insecure deserialization, preventing buffer overruns, and other suitable security features.

In some implementations, the semantic catalogue builder may define a hierarchy for multiple semantic objects included in the semantic catalogue. The hierarchy of semantic objects may include, for example, a parent semantic object and one or more child semantic objects. A child semantic object further defines a feature of the parent semantic object. As an illustrative example, a parent semantic object may be mapped to code segments relating to linked lists. A child semantic object may be mapped to code segments relating to singly-linked lists, and another child semantic object may be mapped to code segments relating to doubly-linked lists.

In some implementations, a semantic object of a semantic catalogue may be mapped to two or more codebases. For example, a semantic object characterized as a spatial semantic may be mapped to locations within two different codebases.

Example IaaS Infrastructure Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
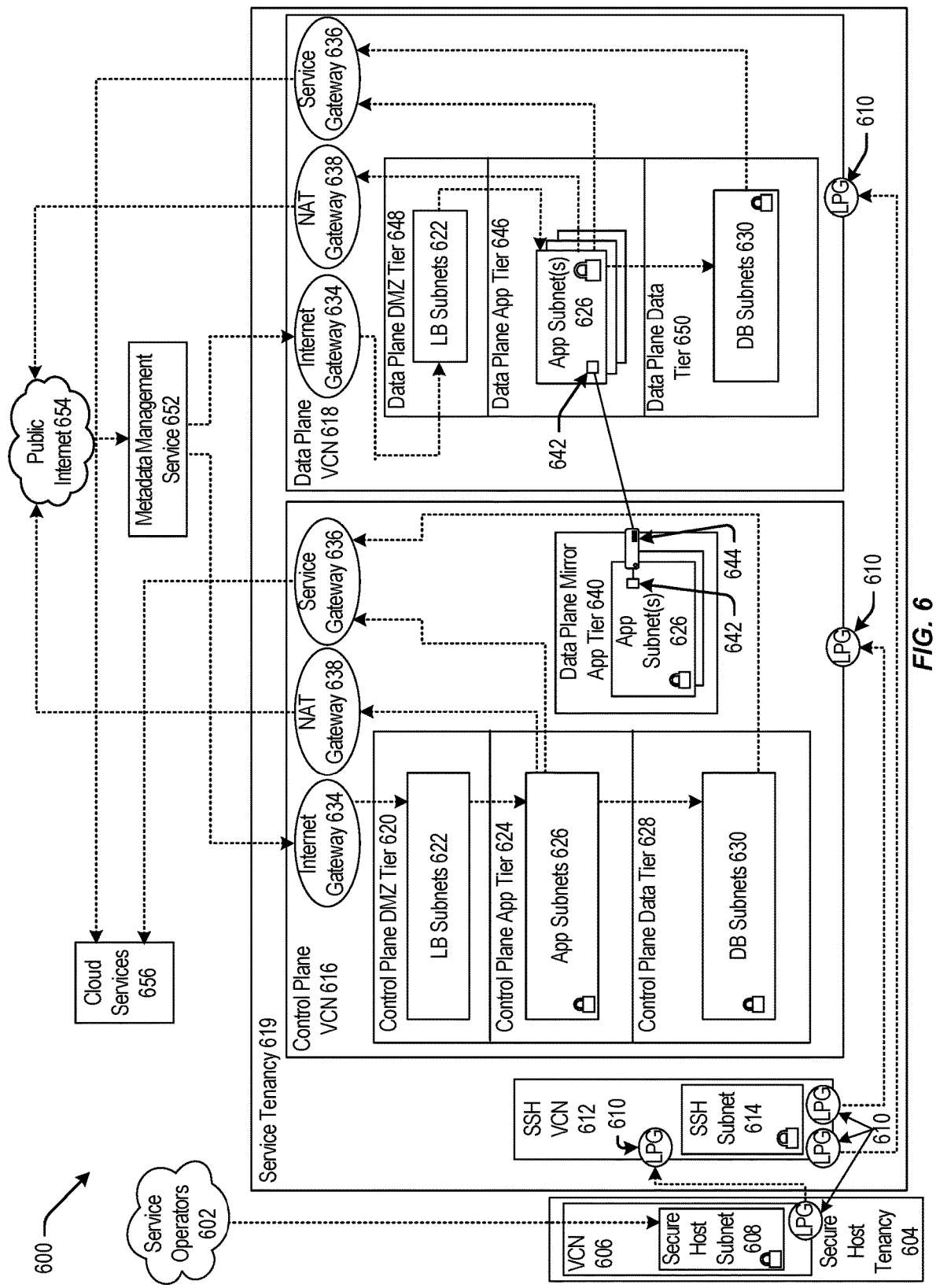
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to setup or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
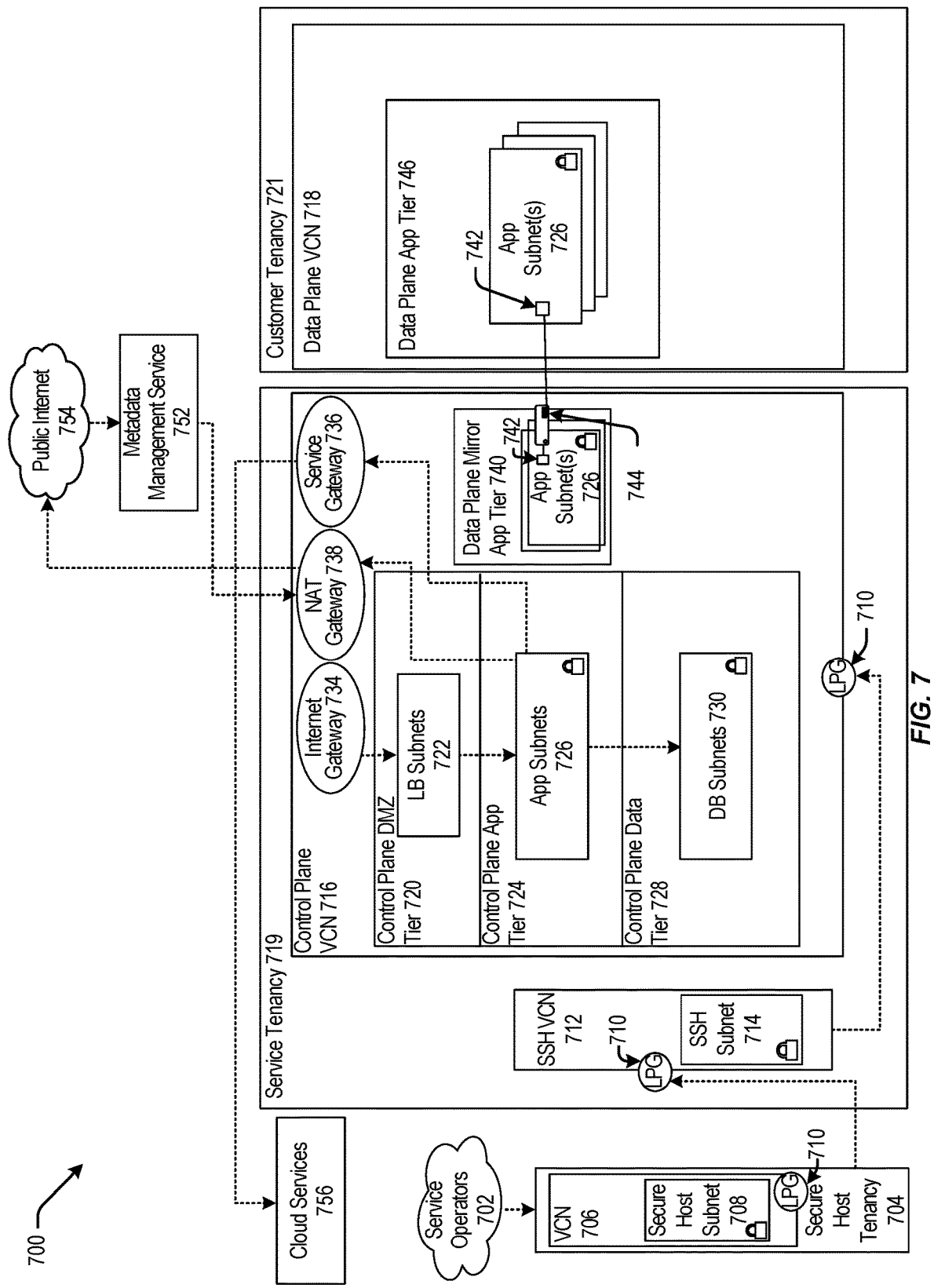
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
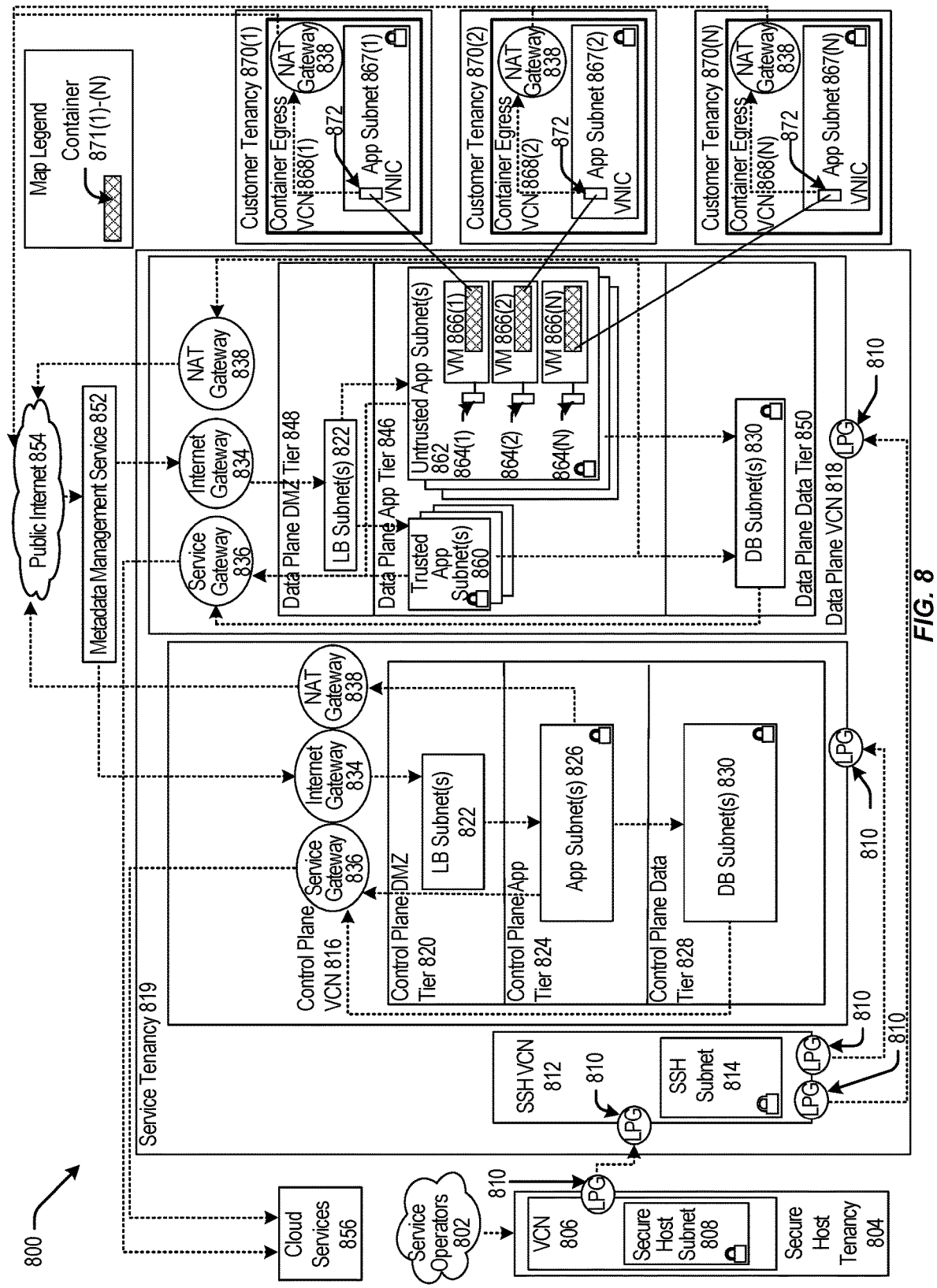
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
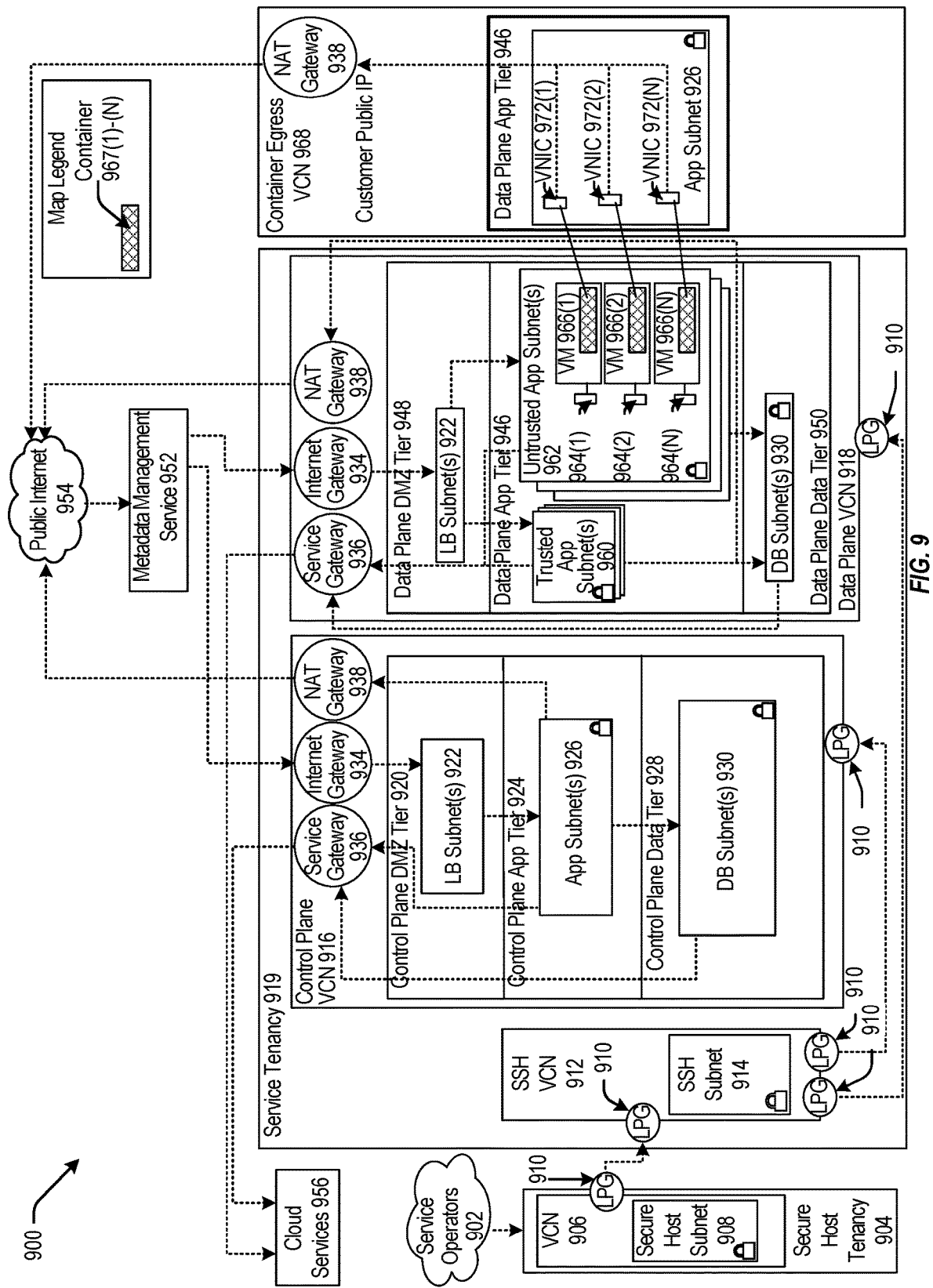
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
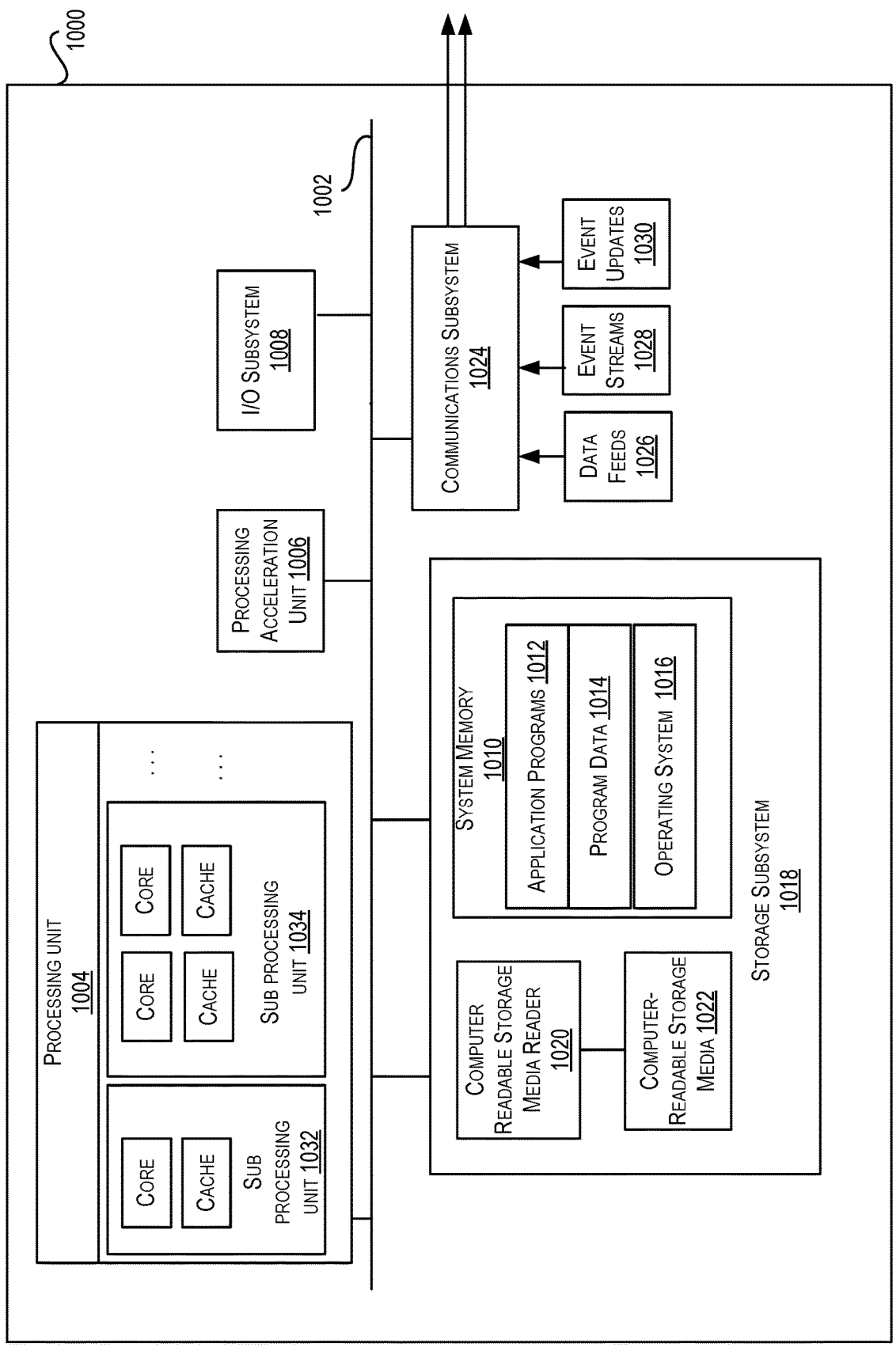
FIG. 10 is a block diagram illustrating an example computer system, according to at least one embodiment.

FIG. 10 illustrates an example computer system 1000, in which various embodiments of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   accessing executable source code of an application, the executable source code including one or more code segments, each code segment of the one or more code segments being defined at a location within the executable source code;
   identifying a code segment of the one or more code segments included in the executable source code;
   defining a semantic object mapped to the location of the code segment, the definition of the semantic object including attributing a granularity and a semantic characteristic to the semantic object,
   the semantic characteristic being attributed from amongst a plurality of semantic characteristics, and the granularity representing a level of abstraction of the semantic object;
   building a semantic catalogue using the defined semantic object, the semantic catalogue including a set of semantic objects associated with the application;
   detecting a modification made to at least a portion of the code segment of the executable source code;
   identifying the semantic object associated with the modified code segment, from amongst the set of semantic objects included in the semantic catalogue;
   tracking the modification made to the code segment by storing the modification in a repository corresponding to the semantic object;
   accessing a test suite including a plurality of test cases; and
   executing each test case of the plurality of test cases included in the test suite.

2. The computer-implemented method of claim 1, the plurality of test cases include a first test case mapped to a first semantic object and a second test case mapped to a second semantic object, and each of the first semantic object and the second semantic object being included in the semantic catalogue,
   wherein the method further comprises:
   detecting that, upon executing the first test case, an outcome of the second test case indicates a failure; and
   in response to the detection, defining a semantic relationship between the first semantic object and the second semantic object.

3. The computer-implemented method of claim 2, further comprising:
   defining a semantic relationship map including the defined semantic relationship between the first semantic object and the second semantic object and another semantic relationship exposed by executing the test suite.

4. The computer-implemented method of claim 1, further comprising:
   detecting a bug within the executable source code, wherein the bug is detected when:
   executing the code segment results in an inconsistency associated with the semantic characteristic assigned to the code segment; or
   an input parameter passed into the code segment is inconsistent with the set of semantic objects included in the semantic catalogue.

5. The computer-implemented method of claim 1, wherein the plurality of semantic characteristics includes any combination from a group comprising of: a spatial semantic, a temporal semantic, a data semantic, a design element semantic, or a security semantic, wherein the spatial semantic represents logic of a function defined at a particular location within the executable source code, wherein the temporal semantic associates a first semantic object with a second semantic object when an output of the first semantic object affects an input of the second semantic object, wherein the design element semantic represents a design feature of a portion of the executable source code, wherein the data semantic represents a semantic of an input parameter to a given code segment attributed as the spatial semantic, and wherein the security semantic represents logic of a security function.

6. The computer-implemented method of claim 1, further comprising:
   defining a hierarchy associated with a subset of semantic objects of the set of semantic objects included in the semantic catalogue, wherein the subset of semantic objects includes a parent semantic object and one or more child semantic objects, and wherein each child semantic object of the one or more child semantic objects further defines a feature of the parent semantic object.

7. The computer-implemented method of claim 1, wherein the defined semantic object is also mapped to another location of another code segment included in another executable source code, and
   wherein the other code segment shares a feature with the code segment defined within the executable source code.

8. A system, comprising:
   one or more processors; and
   a non-transitory computer-readable storage medium containing instructions which, when executed on the one or more processors, cause the one or more processors to perform operations including:
   accessing executable source code of an application, the executable source code including one or more code segments, each code segment of the one or more code segments being defined at a location within the executable source code;
   identifying a code segment of the one or more code segments included in the executable source code;
   defining a semantic object mapped to the location of the code segment, the definition of the semantic object including attributing a granularity and a semantic characteristic to the semantic object,
   the semantic characteristic being attributed from amongst a plurality of semantic characteristics, and the granularity representing a level of abstraction of the semantic object;
   building a semantic catalogue using the defined semantic object, the semantic catalogue including a set of semantic objects associated with the application;
   detecting a modification made to at least a portion of the code segment of the executable source code;
   identifying the semantic object associated with the modified code segment, from amongst the set of semantic objects included in the semantic catalogue;
   tracking the modification made to the code segment by storing the modification in a repository corresponding to the semantic object;
   accessing a test suite including a plurality of test cases; and
   executing each test case of the plurality of test cases included in the test suite.

9. The system of claim 8, wherein
the plurality of test cases including a first test case mapped to a first semantic object and a second test case mapped to a second semantic object, and each of the first semantic object and the second semantic object being included in the semantic catalogue,
wherein the operations further comprise:
detecting that, upon executing the first test case, an outcome of the second test case indicates a failure; and
in response to the detection, defining a semantic relationship between the first semantic object and the second semantic object.

10. The system of claim 9, wherein the operations further comprise:
defining a semantic relationship map including the defined semantic relationship between the first semantic object and the second semantic object and another semantic relationship exposed by executing the test suite.

11. The system of claim 8, wherein the operations further comprise:
detecting a bug within the executable source code, wherein the bug is detected when:
executing the code segment results in an inconsistency associated with the semantic characteristic assigned to the code segment; or
an input parameter passed into the code segment is inconsistent with the set of semantic objects included in the semantic catalogue.

12. The system of claim 8, wherein the plurality of semantic characteristics includes any combination from a group comprising of: a spatial semantic, a temporal semantic, a data semantic, a design element semantic, or a security semantic, wherein the spatial semantic represents logic of a function defined at a particular location within the executable source code, wherein the temporal semantic associates a first semantic object with a second semantic object when an output of the first semantic object affects an input of the second semantic object, wherein the design element semantic represents a design feature of a portion of the executable source code, wherein the data semantic represents a semantic of an input parameter to a given code segment attributed as the spatial semantic, and wherein the security semantic represents logic of a security function.

13. The system of claim 8, wherein the operations further comprise:
defining a hierarchy associated with a subset of semantic objects of the set of semantic objects included in the semantic catalogue, wherein the subset of semantic objects includes a parent semantic object and one or more child semantic objects, and wherein each child semantic object of the one or more child semantic objects further defines a feature of the parent semantic object.

14. The system of claim 8, wherein the defined semantic object is also mapped to another location of another code segment included in another executable source code, wherein the other code segment shares a feature with the code segment defined within the executable source code.

15. A computer-program product tangibly embodied in a non-transitory machine-readable storage medium, including instructions configured to cause a processing apparatus to perform operations including:
accessing executable source code of an application, the executable source code including one or more code segments, each code segment of the one or more code segments being defined at a location within the executable source code;
identifying a code segment of the one or more code segments included in the executable source code;
defining a semantic object mapped to the location of the code segment, the definition of the semantic object including attributing a granularity and a semantic characteristic to the semantic object,
the semantic characteristic being attributed from amongst a plurality of semantic characteristics, and the granularity representing a level of abstraction of the semantic object;
building a semantic catalogue using the defined semantic object, the semantic catalogue including a set of semantic objects associated with the application;
detecting a modification made to at least a portion of the code segment of the executable source code;
identifying the semantic object associated with the modified code segment, from amongst the set of semantic objects included in the semantic catalogue;
tracking the modification made to the code segment by storing the modification in a repository corresponding to the semantic object;
accessing a test suite including a plurality of test cases; and
executing each test case of the plurality of test cases included in the test suite.

16. The computer-program product tangibly embodied in a non-transitory machine-readable storage medium of claim 15, wherein
the plurality of test cases including a first test case mapped to a first semantic object and a second test case mapped to a second semantic object, and each of the first semantic object and the second semantic object being included in the semantic catalogue;
wherein the operations further comprise:
detecting that, upon executing the first test case, an outcome of the second test case indicates a failure; and
in response to the detection, defining a semantic relationship between the first semantic object and the second semantic object.

17. The computer-program product tangibly embodied in a non-transitory machine-readable storage medium of claim 16, wherein the operations further comprise:
defining a semantic relationship map including the defined semantic relationship between the first semantic object and the second semantic object and another semantic relationship exposed by executing the test suite.

18. The computer-program product tangibly embodied in a non-transitory machine-readable storage medium of claim 15, wherein the operations further comprise:
detecting a bug within the executable source code, wherein the bug is detected when:
executing the code segment results in an inconsistency associated with the semantic characteristic assigned to the code segment; or
an input parameter passed into the code segment is inconsistent with the set of semantic objects included in the semantic catalogue.

19. The computer-program product tangibly embodied in a non-transitory machine-readable storage medium of claim 15, wherein the plurality of semantic characteristics includes any combination from a group comprising of: a spatial semantic, a temporal semantic, a data semantic, a design element semantic, or a security semantic, wherein the spatial semantic represents logic of a function defined at a particular location within the executable source code, wherein the temporal semantic associates a first semantic object with a second semantic object when an output of the first semantic object affects an input of the second semantic object, wherein the design element semantic represents a design feature of a portion of the executable source code, wherein the data semantic represents a semantic of an input parameter to a given code segment attributed as the spatial semantic, and wherein the security semantic represents logic of a security function.

20. The computer-program product tangibly embodied in a non-transitory machine-readable storage medium of claim 15, wherein the operations further comprise:

defining a hierarchy associated with a subset of semantic objects of the set of semantic objects included in the semantic catalogue, wherein the subset of semantic objects includes a parent semantic object and one or more child semantic objects, and wherein each child semantic object of the one or more child semantic objects further defines a feature of the parent semantic object.

* * * * *

UNITED STATES PATENT AND TRADEMARK OFFICE
CERTIFICATE OF CORRECTION

PATENT NO. : 11,119,907 B1  
APPLICATION NO. : 16/997680  
DATED : September 14, 2021  
INVENTOR(S) : Gopal Page 1 of 1

It is certified that error appears in the above-identified patent and that said Letters Patent is hereby corrected as shown below:

On the Title Page

On page 2, Column 1, under Other Publications, Line 1, delete "etal," and insert -- et al, --, therefor.

On page 2, Column 2, under Other Publications, Line 22, delete "Su pport" and insert -- Support --, therefor.

In the Specification

In Column 8, Line 66, delete "T" and insert -- $\Psi$ --, therefor.

In Column 12, Line 9, delete "l" and insert -- $l_i$ --, therefor.

In Column 12, Line 16, delete "$l_1$" and insert -- $l_i$ --, therefor.

In Column 12, Line 17, delete "$f_1$" and insert -- $f_i$ --, therefor.

In Column 12, Line 17, delete "$r_1$" and insert -- $r_i$ --, therefor.

In Column 14, Line 5, delete "Anyone" and insert -- Any one --, therefor.

In Column 17, Line 30, delete ""delete"" and insert -- "delete( )" --, therefor.

In Column 26, Line 34, delete "setup" and insert -- set up --, therefor.

In Column 34, Line 45, delete "Siri" and insert -- Siri® --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*